United States Patent [19]

Katata et al.

[11] Patent Number: 5,631,644
[45] Date of Patent: May 20, 1997

[54] IMAGE ENCODING APPARATUS

[75] Inventors: Hiroyuki Katata, Ichihara; Hiroshi Kusao; Yohichi Fujiwara, both of Chiba, all of Japan

[73] Assignee: Sharp Kabushiki Kaisha, Osaka, Japan

[21] Appl. No.: 362,148

[22] Filed: Dec. 22, 1994

[30] Foreign Application Priority Data

Dec. 22, 1993 [JP] Japan .................. 5-325063

[51] Int. Cl.$^6$ .................................. H03M 7/30
[52] U.S. Cl. .................. 341/67; 341/51; 358/426
[58] Field of Search .................. 341/67, 51; 358/426, 358/430; 382/232, 238, 239

[56] References Cited

U.S. PATENT DOCUMENTS

| | | | |
|---|---|---|---|
| 4,276,544 | 6/1981 | Iinuma | 340/347 AD |
| 4,989,130 | 1/1991 | Moriyama et al. | |
| 5,038,209 | 8/1991 | Hang | |
| 5,134,476 | 7/1992 | Aravind et al. | 358/133 |
| 5,163,056 | 11/1992 | Hagiwara et al. | |
| 5,202,770 | 4/1993 | Murakami et al. | 358/426 |
| 5,235,618 | 8/1993 | Sakai et al. | |
| 5,253,059 | 10/1993 | Ansari et al. | 358/138 |
| 5,283,646 | 2/1994 | Bruder | 348/415 |
| 5,317,397 | 5/1994 | Odaka et al. | |
| 5,319,457 | 6/1994 | Nakahashi et al. | |
| 5,333,012 | 7/1994 | Singhal et al. | 348/405 |

FOREIGN PATENT DOCUMENTS

| | | |
|---|---|---|
| 0493136 | 7/1992 | European Pat. Off. |
| 0536630 | 4/1993 | European Pat. Off. |
| 5111012 | 4/1993 | Japan. |

OTHER PUBLICATIONS

"Hybrid Extended MPEG Video Coding Algorithm for General Video Applications" by Messrs. Chen, Jeng, Kawashima, Singhal and Wong; Signal Processing Image Communication, vol. 5; Feb. 1993; Amsterdam, NL; pp. 21–37.

"A Video Compression Algorithm with Adaptive Bit Allocation and Quantization" by Eric Viscito et al., Visual Communication and Image Processing 1991; Visual Communication, vol. 1605, No. 1; Nov. 11, 1991, Boston, MA, pp. 58–72.

"MPEG2 Interframe Prediction," H. Watanabe, ITEJ Technical Report vol. 16, No. 61, pp. 37–42, ICS '92–73, Oct. 1992.

"MPEG2 Quantization and Coding Control," Y. Katayama, ITEJ Technical Report vol. 16, No. 61, pp. 43–48, ICS '92–74, Oct. 1992.

*Primary Examiner*—Jeffrey A. Gaffin
*Assistant Examiner*—Jason L. W. Kost

[57] ABSTRACT

In an image encoding apparatus, image information is quantized and variable-length encoding is performed thereon so that the data are stored in a buffer. Thereafter, the data in the buffer are transmitted to the outside at a fixed data rate. At this time, a controller monitors a number of occupied bits in the buffer, and when the number of occupied bits is not more than predetermined thresholds, the controller switches the output of the apparatus to a dummy data generator. At this time, a parameter which is used for rate control is initialized, and dummy data which can be eliminated at a decoding circuit are outputted from the dummy data generator. Furthermore, bit allocation is changed so that a sum of the number of occupied bits and the bit allocation to a frame, which is determined before encoding, does not exceed a fixed amount. Moreover, when the number of occupied bits exceeds the fixed value, a quantization step size is changed to a greater value. This efficiently prevents underflow and overflow of the buffer, and the image information can be encoded with excellent quality.

18 Claims, 16 Drawing Sheets

IMAGE ENCODING APPARATUS

FIELD OF THE INVENTION

The present invention relates to an image encoding apparatus which is provided to an apparatus for performing a digital image process, such as a videophone, a digital video disk apparatus, and which encodes image information efficiently in order to improve efficiency of recording and transmitting of image information.

BACKGROUND OF THE INVENTION

In the case where image information with a wide band is recorded or transmitted, if the image information has its original configuration, a capacity of a recording medium and a transmitting medium is required for an amount of its data amount. Thus, efficiency of recording and transmitting is deteriorated. For this reason, an amount of data of image information is generally compressed so as to be suitable for an ability in recording of a recording medium or an ability in transmitting of a transmitting medium. Such a data compressing process is realized by encoding high-efficiently digital motion picture information by means of arts, such as motion compensation inter-frame prediction, orthogonal transformation, quantization, variable-length encoding.

For example, in a high-efficient encoding system cited in the literature "MPEG2 Interframe Prediction" (the Institute of Television Engineers, Technical Report Vol. 16 No. 61. pp. 37–42), there exists a frame on which only intra-frame encoding is performed (hereinafter, referred to as I picture), a frame on which predictive encoding from the previous frame is performed (hereinafter, referred to as P picture) and a frame on which predictive encoding from the previous and subsequent frames is performed (hereinafter, referred to as B picture). An amount of codes generated in I picture is great, an amount of codes generated in P picture is smaller than that in the I picture, and an amount of codes generated in B picture is fairly smaller than those in the I picture and the P picture.

When the high efficient encoding system is applied to image transmission and image storing (recording), there arises a problem of how a data rate after encoding (hereinafter, referred to as encoded data) is controlled.

For example, the literature "MPEG2 Quantization and Coding Control (the Institute of Television Engineers, Technical Report Vol. 16 No. 61. pp. 43–48) discloses a method for almost constantly controlling an average number of bits in a given interval which is called group of pictures (hereinafter, referred to as GOP) (an interval from I picture to next I picture, and a number of pictures in the GOP is normally ten-odd frames).

FIG. 16 is a block diagram of an image encoding apparatus utilizing a conventional method.

First, in a block dividing circuit 51, a frame to be encoded is divided into blocks which are called a macroblock (hereinafter, referred to as MB). Intra-frame encoding or inter-frame encoding is performed per MB.

In a motion compensation inter-frame predicting circuit 52, a current frame is compared with a frame previously encoded and decoded so that while an amount of a movement of MB (move vector) is being detected, the MB is predicted from a decoded frame. However, MB of I picture and MB in which intra-frame encoding is advantageous are not predicted. The predicting method is disclosed in the literature "MPEG2 Interframe Prediction" (the Institute of Television Engineers, Technical Report Vol. 16 No. 61. pp. 37–42).

In an orthogonal transforming circuit 53, the data of MB are transformed to data suitable for encoding by two-dimensional orthogonal transformation (for example, discrete Fourier transformation, Hadamard transformation, discrete cosine transformation, etc.). At this time, in the case of intra-frame encoding, two-dimensional orthogonal transformation is carried out on the data of MB from the block dividing circuit 51, whereas in the case of inter-frame encoding, a switch 54 is switched to the motion compensation inter-frame predicting circuit 52, a prediction difference (prediction error) is obtained by a subtracter 55 and two-dimensionally orthogonal transformation is carried out on the prediction error.

In a quantizing circuit 56, transform coefficients are quantized by a quantization step size obtained in a quantization step size determining circuit 66, and in a variable-length encoding circuit 57, variable-length encoding is performed on the quantized transform coefficient. Then, in a buffer 58, the output from the variable-length encoding circuit 57 is temporarily stored and encoded data are outputted at a determined constant data rate.

In addition, the transform coefficient quantized in the quantizing circuit 56 are inversely quantized in an inverse quantizing circuit 59 and inverse orthogonal transformation is carried out on inversely quantized transform coefficient in an inverse orthogonal transform circuit 60.

In the case of inter-frame encoding, since the reconstructed value from the inverse orthogonal transforming circuit 60 is the data of the prediction difference, a switch 62 is switched to a terminal 62a side, and in an adder 61, the data of the prediction difference as the reconstructed value and prediction MB outputted from the motion compensation inter-frame predicting circuit 52 are added so that reconstructed image data can be obtained. Meanwhile, in the case where the reconstructed value from the inverse orthogonal transforming circuit 60 is the data of MB on which intra-frame encoding is performed, since the reconstructed data directly becomes reconstructed image data, the switch 62 is switched to a terminal 62b side.

The reconstructed image data are stored in a frame memory 63. The reconstructed image data are used as a reference image for inter-frame prediction in the motion compensation inter-frame predicting circuit 52.

In addition, in the conventional image encoding apparatus, encoding control is performed by a bit allocating circuit 64, a reference quantization step size determining circuit 65 and a quantization step size determining circuit 66. The following will discuss the encoding control in detail.

The bit allocating circuit 64 determines a number of bits which are allocated to a frame to be encoded per frame based upon the encoded results up to the previous frame (a number of generated bits obtained from the various-length encoding circuit 57, and an average value of quantization widths obtained from the quantization step size determining circuit 66) and the given data rate. Concretely, global complexity measures $X_I$, $X_P$ and $X_B$ of I picture, P picture and B picture are determined according to the following formulas (1) through (3).

$$X_I = S_I \overline{Q}_I \quad (1)$$

$$X_P = S_P \overline{Q}_P \quad (2)$$

$$X_B = S_B \overline{Q}_B \quad (3)$$

In the formulas (1) through (3), $S_I$, $S_P$ and $S_B$ represent an amount of encoded data of previous I picture, P picture and B picture (a number of generated bits). Moreover, $\overline{Q}_I$, $\overline{Q}_P$ and $\overline{Q}_B$ represent an average quantization step size at the time of encoding of previous I picture, P picture and B picture.

The global complexity measures are based upon that when an image to be encoded is complex, a number of generated bits increase and a quantization step size tends to be enlarged in order to restrict increase in the number of generated bits. However, a fixed initial value is set as the global complexity measures at the beginning of encoding.

Next, as to the bit allocating circuit 64 determines target bit allocation $T_I$, $T_P$ and $T_B$ to an image to be encoded of I picture, P picture and B picture according to calculation of the following formulas (4) through (6).

$$T_I = \frac{R}{1 + \frac{N_P X_P}{X_P X_I} + \frac{N_B X_B}{K_B X_I}} \quad (4)$$

$$T_P = \frac{R}{N_P + \frac{N_B K_P X_B}{K_B X_P}} \quad (5)$$

$$T_B = \frac{R}{N_B + \frac{N_P K_B X_P}{K_P X_B}} \quad (6)$$

In the above formulas (4) through (6), R represents a number of remained bits in GOP, $N_P$ and $N_B$ represent a number of P pictures and B pictures which have not been encoded yet in GOP, and $K_P$ and $K_B$ represent constants.

Next, the reference quantization step size determining circuit 65 and the quantization step size determining circuit 66 determine a quantization step size by using the values $T_I$, $T_P$ and $T_B$. In the case of I pictures, in order to obtain a quantization step size, a reference quantization step size $q_j^I$ which becomes a basis is first obtained and is compensated according to an activity of an image so that a quantization step size $Q_j^I$ (j is a number of MB) is obtained. Also as to P picture and B picture, since a quantization step size can be determined in the same manner as of I picture, the following will discuss determination of a quantization step size of I picture.

First, in the reference quantization step size determining circuit 65, a reference quantization step size of orthogonal transformation coefficient is determined per MC based upon a number of generated bits up to the previous MB obtained in the variable-length encoding circuit 57 and a number of bits $T_I$ which is allocated by the bit allocating circuit 64.

In other words, the reference quantization step size determining circuit 65 determines virtual buffer fullness $d_j^I$ in the j-th block of I picture according to the following formula (7).

$$d_j^I = d_0^I + B_{j-1} - \frac{T_I(j-1)}{MBcnt} \quad (7)$$

The reference quantization step size determining circuit 65 determines a reference quantization step size $q_j^I$ per MC according to calculation of the following formula (8).

$$q_j^I = \frac{31 d_j^I}{r} \quad (8)$$

In the formula (7), $d_0^I$ is an initial buffer fullness (final buffer fullness $q_{MBcnt}^I$ at the time of encoding previous I picture, and its initial value is a certain constant), $B_j$ is a total number of bits generated in an image up to the j-th block, and MBcnt is a total number of MB in an image. Furthermore, r in the formula (8) is a constant which is called a reaction parameter.

In the formula (7), $T_I$ bit is equally allocated to each MB, and a difference between a number of allocated bits up to the previous MB and a number of actually generated bits is reflected in the virtual buffer fullness. Therefore, if a number of generated bits up to the previous MB is great, the virtual buffer fullness becomes large, and also the reference quantization step size becomes large, so a number of subsequently generated bits is restricted. On the contrary, if the number of generated bits up to the previous MB is small, the virtual buffer fullness becomes small, and also the reference quantization step size becomes small, so a number of subsequently generated bits is enlarged. Here, in P picture and B picture, reference quantization widths $q_j^P$ and $q_j^B$ are determined in the same manner.

In the quantization step size determining circuit 66, an activity which shows fineness of a picture in MB obtained from the block dividing circuit 51 is calculated per MB, and the reference quantization step size $q_j^I$ is changed by the activity per MB so that a quantization step size which is used in the quantizing circuit 56 is determined.

In other words, the quantization step size determining circuit 66 determines the quantization step size $Q_j^I$ of the j-th MB in I picture is determined according to the following formula (9).

$$Q_j^I = q_j^I \, Nact_j \quad (9)$$

Here, $Nact_j$ in the formula (9) is an activity of the j-th MB which is normalized, and it is represented by the following formula (10).

$$Nact_j = \frac{2 act_j + avg}{act_j + 2 avg} \quad (10)$$

In the formula (10), $act_j$ is the activity of the j-th MB, and avg is an average value of the activities in a previously encoded frame (it is not always I picture) (however, a predetermined initial value is set for activity at the beginning of encoding). Here, also in P picture and B picture, quantization widths $Q_j^P$ and $Q_j^B$ are determined in the same manner as in the above.

In order to explain the problem of the conventional image encoding apparatus, the following will discuss a number of occupied bits in the buffer 58 in the image encoding apparatus (different from the virtual buffer fullness mentioned in the prior arts).

Here, the occupied bits in the buffer 58 is defined as follows. In other words, in the case where after encoding of each image frame and storing of encoded data in the buffer 58 are instantly completed in an image encoding apparatus, the encoded data are outputted at a constant data rate, buffer occupied bits are defined as a number of bits of the encoded data which remain in the buffer 58.

FIG. 17 shows an example of an aged change in the number of occupied bits in the buffer 58 with respect to a typical motion picture sequence (image 1). Here, a horizontal axis shows a time which is represented by a frame, a vertical axis shows the number of occupied bits in the buffer 58, and an initial number of occupied bits is 0. Moreover, a bit rate is 6 Mbps, a number of frames in GOP is 15, and an interval between I picture and P picture and an interval between P pictures are 3 frames.

As is clear from FIG. 17, at time 0 a lot of data are generated by encoding I picture, but as to subsequent P picture and B picture, an encoding amount is adjusted, so the number of occupied bits in the buffer 58 substantially returns to the initial value with respect to first images in each GOP (time 15, 30, 45, etc.). In this manner, if data amount control in the GOP is satisfactorily made, the first number of occupied bits in the buffer 58 in each GOP always returns to near the initial value. Therefore, it is sufficient that a capacity of the buffer 58 is $10^6$ bit, for example.

The following will discuss a motion picture sequence including stop motion or frequent scene changes. In a sequence which is shifted to a normal motion picture after stop motion continues for 30 frames (image 2), a number of occupied bits in the buffer 58 is shown by a solid line in FIG. 18. In a sequence which is shifted to a normal motion picture after frequent scene changes continue for 30 frames (image 3), a number of occupied bits in the buffer 58 is shown by a broken line in FIG. 18.

In the case where the capacity of the buffer 58 is $10^6$ bit, as shown in FIG. 18, data overflow greatly after time 15 and after time 30 in the image 2, that is, overflow occurs. The overflow occurs after time 15 of the image 2, for when a new GOP starts in a stop motion and I picture appears, an extraordinarily large many number of bits are allocated to the I picture and a lot of encoded data is generated. Moreover, also in I picture in a motion picture immediately after the stop motion, a lot of encoded data is generated, so overflow occurs even after time 30 in the image 2.

In order to avoid such overflow, the capacity of the buffer 58 should be enlarged, but this arises a problem that a scale of hardware increases. Moreover, in the case where a lot of encoded data is generated partially (all at once) compared to the above-mentioned normal sequence, a remaining number of bits allocated to GOP (a number of remaining bits in GOP) is extremely decreased. Therefore, there arises a problem that quality of an image thereafter is remarkably deteriorated.

In addition, there exist no encoded data in the buffer 58 after time 53 of the image 2, at times 25 through 29 of the image 3, etc., so underflow occurs. This can be a problem in actual hardware. Moreover, in the case where underflow occurs, a rate is not successively controlled, so there arises a problem that quality of an image is remarkably deteriorated due to encoding by using an inappropriate quantization step size.

SUMMARY OF THE INVENTION

It is an object of the present invention to provide an image encoding apparatus which is capable of encoding an image with good quality and without underflow of a buffer.

In order to achieve the above object, the image encoding apparatus of the present invention is characterized by including:

(1) quantizing means for quantizing information which corresponds to an image;

(2) variable-length encoding means for performing variable-length encoding on the quantized result of the quantizing means;

(3) temporary storage means for temporarily storing encoded data from the variable-length encoding means so as to transmit the stored encoded data to the outside at a fixed data rate;

(4) encoded data amount control means for calculating a quantization step size for quantizing information to be encoded based upon the encoded result of the variable-length encoding means so as to control an amount of the encoded data of the variable-length encoding means;

(5) dummy data generating means for generating dummy data which can be eliminated on a decoding side for decoding the encoded data;

(6) switching means for switching an output of the image encoding apparatus to either the encoded data from the temporary storage means or to the dummy data from the dummy data generating means; and (7) control means for monitoring a number of occupied bits in the temporary storage means so as to control a switching operation of the switching means so that the output of the image encoding apparatus becomes the encoded data from the temporary storage means when the number of occupied bits exceeds a predetermined threshold, whereas so as to suspend transmission of data in the temporary storage means and control the switching operation of the switching means so that the output of the image encoding apparatus becomes the dummy data generated from the dummy data generating means when the number of occupied bits is not more than the threshold.

With the above arrangement, the information corresponding to image information is quantized by the quantizing means and variable-length encoding is performed on the quantized result by the variable-length encoding means so that the encoded data are stored in the temporary storage means. In this case, an amount of encoded data in the variable-length encoding means is controlled by the encoded data amount control means which calculates a quantization step size of information to be encoded based upon the encoded result of the variable-length encoding means so as to adjust a quantization step size of quantization in the quantizing means according to the calculated result. The encoded data stored in the temporary storage means are transmitted to the outside at a data rate, which is suitable for a process by an outer apparatus. At this time, it is necessary to adjust a number of occupied bits in the temporary storage means (an amount of encoded data stored in the temporary storage means) so that the generated encoded data do not exceed a memory capacity of the temporary storage means (occurrence of overflow), and the encoded data to be transmitted to the outside do not run out in the temporary storage means (occurrence of underflow).

Therefore, the dummy data generating means for generating dummy data which can be eliminated on a decoding circuit for decoding the encoded data is provided so that an output of the image encoding apparatus can be switched to either the encoded data from the temporary storage means or the dummy data from the dummy data generating means by the switching means. Furthermore, the number of occupied bits in the temporary storage means is monitored by the control means. The switching operation of the switching means is controlled by the control means so that if the number of occupied bits exceeds the predetermined thresholds, the output of the image encoding apparatus is the encoded data from the temporary storage means, and if the number of occupied bits is not more than the thresholds, the output of the image encoding apparatus is the dummy data from the dummy data generating means.

Therefore, if the number of occupied bits in the temporary storage means is not more than the thresholds, the dummy data from the dummy data generating means are outputted from the image encoding apparatus instead of the encoded data read out from the temporary storage means. While the dummy data are being outputted, the transmission of the encoded data in the temporary storage means is suspended. During this operation, if the number of occupied bits in the temporary storage means exceeds the thresholds, the encoded data in the temporary storage means are again outputted at a constant data rate. For this reason, a lower limit of the number of occupied bits in the temporary storage means can be substantially limited to the thresholds, so the underflow of the temporary storage means can be prevented.

In addition, it is preferable that when the number of occupied bits is not more than the thresholds, the control means (7) outputs a switching signal to the encoded data amount control means, and when the switching signal is inputted, the encoded data amount control means (4) controls initializing of various parameters which are used for calculation of the quantization step size. As a result, even when the dummy data are outputted instead of the actual encoded data, the parameters which are used for rate control can keep their balance and the stable rate control can be made. Therefore, a deterioration in quality of an image can be restrained.

It is another object of the present invention to provide an image encoding apparatus which is capable of encoding an image without overflow in a buffer and with good quality.

In order to achieve the above object, another image encoding apparatus of the present invention having the quantization means (1), the variable-length encoding means (2) and the temporary storage means (3) is characterized by including:

(8) encoded data amount control means for calculating bit allocation per frame of information to be encoded based upon the encoded result of said variable-length encoding means and calculating a quantization step size from the above calculated result so as to control an amount of the encoded data of said variable-length encoding means by adjusting the quantization step size of quantization in said quantizing means according to the above calculated result, wherein said encoded data amount control means (8) includes bit allocation changing means for monitoring a number of occupied bits in the temporary storage means so as to change the calculated bit allocation when the sum of bit allocation to a frame which has been calculated before encoding and a number of occupied bits in said temporary storage means at the time of the calculation of the bit allocation exceeds the predetermined thresholds, such that the sum does not exceed the thresholds.

With the above arrangement, the encoded data amount control means calculates bit allocation per frame of information to be encoded so as to determine a quantization step size. The encoded data amount control means includes bit allocation changing means for changing the calculated bit allocation. The bit allocation changing means monitors the number of occupied bits in the temporary storage means and changes the calculated bit allocation so that a sum of the bit allocation to a frame calculated before encoding and the number of occupied bits in the temporary storage means at the time of calculation of the bit allocation do not exceed the predetermined thresholds. Therefore, even when the frame information are encoded and stored in the temporary storage means, the number of occupied bits in the temporary storage means at this time do not greatly exceed the thresholds. As a result, the overflow can be prevented by setting the thresholds to smaller values than the memory capacity of the temporary storage means.

In addition, it is desirable that the encoded data amount control means (8) further includes quantization step size changing means for monitoring the number of occupied bits in the temporary storage means so as to change the calculated quantization step size to a greater value when the number of occupied bits exceeds the fixed thresholds. This makes it possible to efficiently prevent the overflow of the temporary storage means.

For a fuller understanding of the nature and advantages of the invention, reference should be made to the ensuing detailed description taken in conjunction with the accompanying drawings.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE EMBODIMENTS

[EMBODIMENT 1]

The following description will discuss one embodiment of the present invention mainly referring to FIGS. 1 through 3 and FIGS. 13 through 15.

Figure 1:
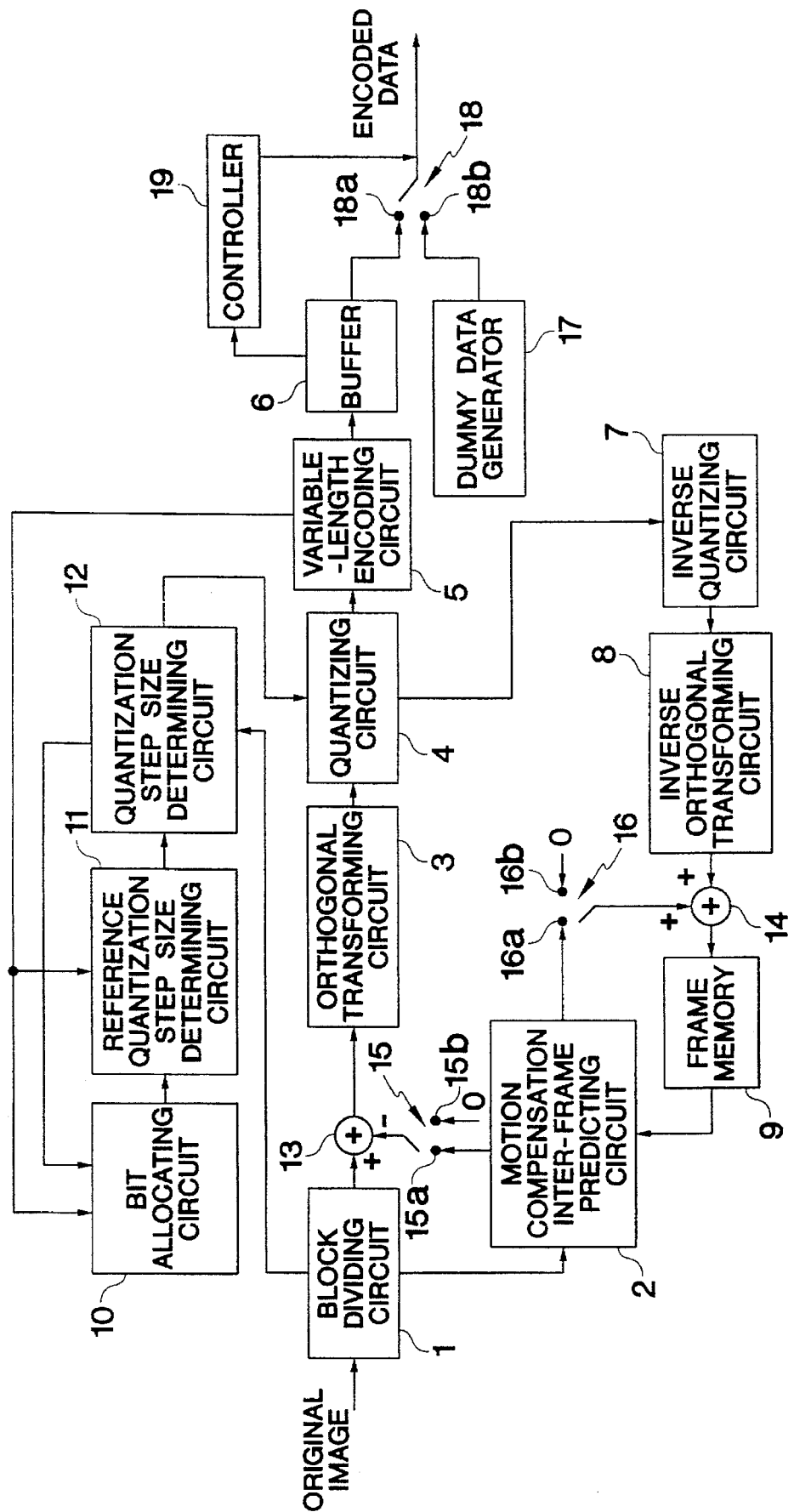
FIG. 1 is a block diagram which shows an arrangement of a main circuit in an image encoding apparatus of the first embodiment of the present invention.

The image encoding apparatus of the present invention controls underflow of a buffer which is one of the problems in the prior arts, and an arrangement of its main part is shown in FIG. 1.

As shown in FIG. 1, the image encoding apparatus includes a block dividing circuit 1, a motion compensation inter-frame predicting circuit 2, an orthogonal transforming circuit 3, an quantizing circuit 4 as quantizing means, a variable-length encoding circuit 5 as variable-length encoding means, a buffer 6 as temporary storing means, an inverse quantizing circuit 7, inverse orthogonal transforming circuit 8, a frame memory 9, a bit allocating circuit 10, a reference quantization step size determining circuit 11, a quantization step size determining circuit 12, a subtracter 13, an adder 14 having two input terminals, a switch 15 for switching an input to a minus input terminal of the subtracter 13, a switch 16 for switching an input to one input terminal of the adder 14, a dummy data generator 17 as dummy data generating means, a switch 18 as switching means for switching whether an output of the image encoding apparatus is performed from the buffer 6 or the dummy data generator 17, and a controller 19 as control means for controlling the switch 18 while supervising a number of occupied bits in the buffer 6.

In the same manner as the prior arts, the image encoding apparatus divides a frame to be encoded into, for example, MBs of 16×16 pixels and intra-frame encoding or intra-frame predictive encoding is performed per MB. There exists a frame on which only intra-frame encoding is performed (I picture), a frame on which inter-frame predictive encoding is performed from previous frame (P picture), and a frame on which inter-frame predictive encoding is performed from previous and subsequent frames (B picture). The intra-frame encoding is performed at a predetermined frame interval. In the present embodiment, the intra-frame encoding is performed per 15 frames (in other words, a number of frames in GOP N is 15), but the present invention is not limited to this, so a number of frames in the GOP N can be changed by setting.

Figure 3:
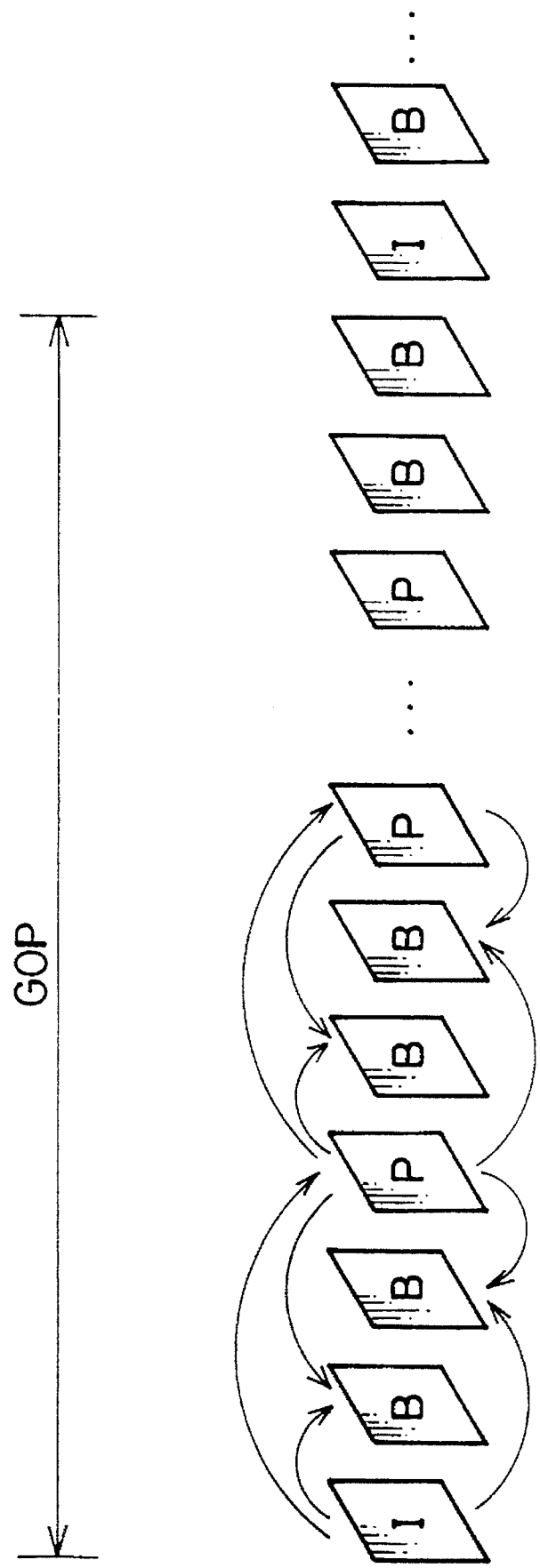
FIG. 3 is an explanatory drawing which explains an arrangement of GOP and a inter-frame predicting method.

As shown in FIG. 3, a first image (frame) in the GOP is an I picture. Non intra prediction is performed on a P picture after a predetermined number of frames M from the I picture, and from the I picture and the P picture, inter-frame prediction is performed on a B picture between the I picture and the P picture. Moreover, inter-frame prediction is performed on a P picture after a predetermined number of frames M from P picture on which inter-frame prediction has been performed from the I picture, and from the both P pictures, inter-frame prediction is performed on B picture between the P pictures. In this manner, as to P picture, inter-frame prediction is performed from previous I picture or previous P picture, and as to B picture, inter-frame prediction is made from I picture or P picture before and after the B picture. As to an arrangement of the GOP in a number of frames N, a first frame in the GOP is an I picture, (1+nM)th frame in the GOP is a P picture (however, 1+nM≦N, n is a natural number), frames other than the above frames in the GOP are B pictures. In the present embodiment, as shown in FIG. 3, an interval between an I picture and a P picture and an interval between P pictures M are 3, but the present invention is not limited to this, so M may be 2 or not less than 4.

As shown in FIG. 1, an original image is inputted to the block dividing circuit 1 (after in the case where the original image is analog, it is transformed to digital), and a frame to be encoded is divided into, for example, MBs of 16×16 pixels so that the MBs are inputted to a plus input terminal of the subtracter 13, the motion compensation inter-frame predicting circuit 2 and the quantization step size determining circuit 12.

The motion compensation inter-frame predicting circuit 2 compares a current frame with a frame previously encoded and decoded, and while a moving amount of the MB (a moving vector) is detected, the MBs of P picture or B picture, in which inter-frame encoding is advantageous, are predicted from another frame as mentioned above. However, the MB of I picture and a MB in which intra-frame encoding is advantageous are not predicted.

In the case where an output of the block dividing circuit 1 is the MB of the I picture or the MB in which intra-frame encoding is advantageous, the switch 15 is entered to an input terminal 15b side, and the MB of the I picture is inputted from the subtracter 13 directly to the orthogonal transforming circuit 3.

Meanwhile, in the case where the output of the block dividing circuit 1 is the MB of P picture or B picture, the switch 15 is entered to an input terminal 15a side, a MB from the block dividing circuit 1 and an predicted MB from the motion compensation inter-frame predicting circuit 2 are respectively inputted to a plus and a minus input terminals of the subtracter 13, and a prediction difference (prediction error) is outputted from the subtracter 13 to the orthogonal transforming circuit 3.

Data from the subtracter 13 (MB or prediction difference) are converted into data suitable for encoding by means of two-dimensional orthogonal transformation (discrete Fourier transformation, Hadamard transformation, discrete cosine transformation, etc.) in the orthogonal transforming circuit 3, and the transformed data are outputted to the quantizing circuit 4.

In the quantizing circuit 4, a result of the two-dimensional orthogonal transformation (namely, a transform coefficient) is quantized by using a quantization step size obtained in the quantization step size determining circuit 12, and the quantized result is outputted to the variable-length encoding circuit 5 and the inverse quantizing circuit 7.

In the variable-length encoding circuit 5, variable-length encoding is performed on the quantized transform coefficient, and the encoded transform coefficient is outputted to the buffer 6 and the bit allocating circuit 10.

The encoded data from the variable-length encoding circuit 5 are temporarily stored in the buffer 6, and the encoded data are outputted at a predetermined constant data rate therefrom.

The quantized transform coefficient is inversely quantized in the inverse quantizing circuit 7 and is outputted to the inverse orthogonal transforming circuit 8.

Reverse orthogonal transformation is carried out on the inversely quantized transform coefficient by the inverse orthogonal transforming circuit 8 so that a reconstructed value before the orthogonal transformation (MB or prediction difference) is obtained.

In the case where the reconstructed value is a prediction difference, the switch 16 is changed to an input terminal 16a side, and the prediction difference as a reconstructed value and the prediction MB outputted from the motion compensation inter-frame predicting circuit 2 are added in the adder 14 so that an MB is reconstructed. Meanwhile, in the case where the reconstructed value is an MB on which intraframe encoding is performed, the switch 16 is changed to an input terminal 16b side so that the reconstructed value is directly outputted to the frame memory 9.

A reconstructed image obtained from the MB reconstructed in the above manner is stored in the frame memory 9. The reconstructed image is used as a reference image for inter-frame prediction in the motion compensation interframe predicting circuit 2.

Figure 16:
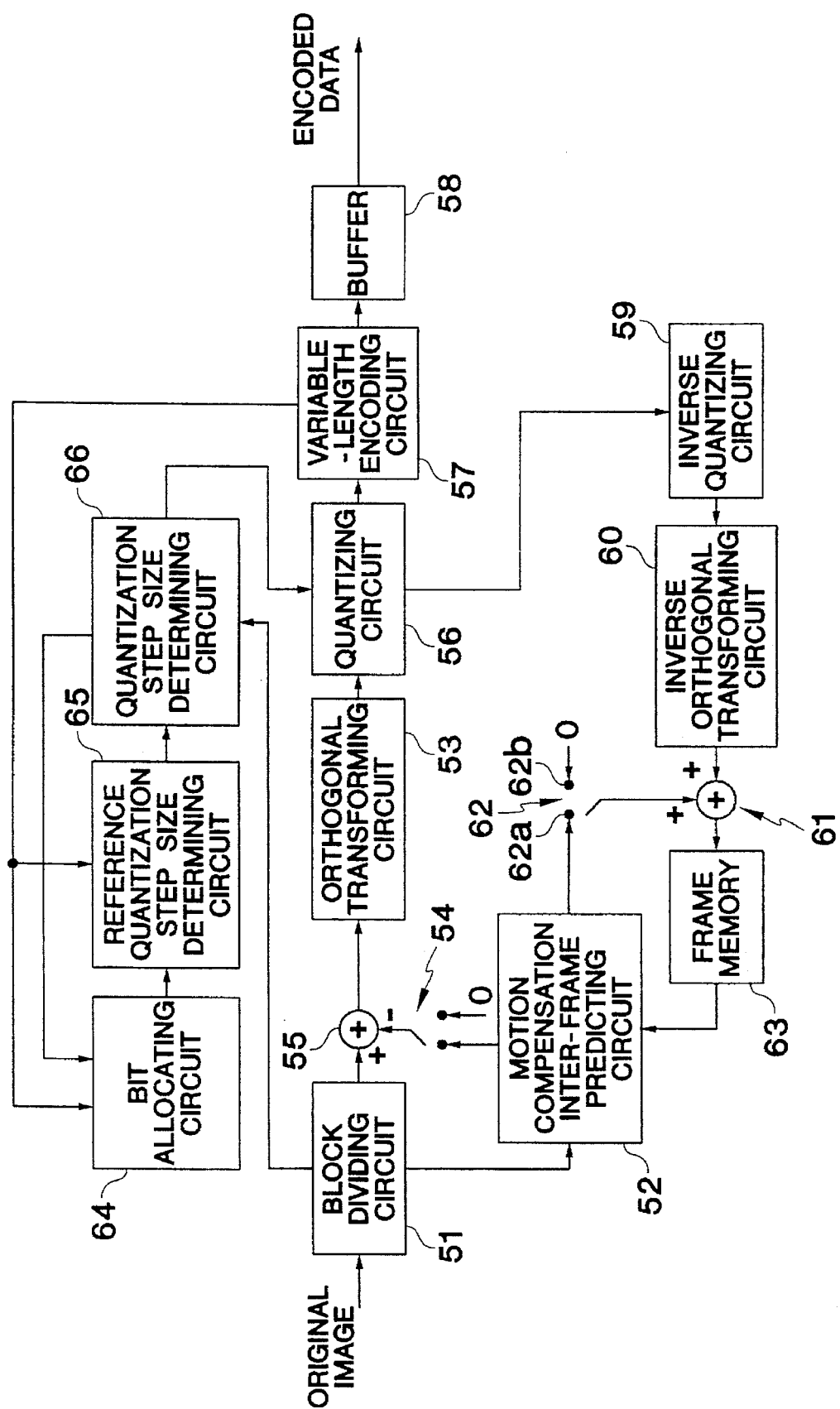
FIG. 16 is a block diagram which shows an arrangement of a main circuit in a conventional image encoding apparatus.

The bit allocating circuit 10, the reference quantization step size determining circuit 11 and the quantization step size determining circuit 12 control generating of an amount of encoded data, and they have the same functions and arrangements as those of a bit allocating circuit 64, a reference quantization step size determining circuit 65, and a quantization step size determining circuit 66 in a conventional image encoding apparatus shown in FIG. 16.

In other words, the bit allocating circuit 10 determines a number of bits which are allocated to a frame to be encoded based upon encoded results up to the previous frame (a number of generated bits obtained from the variable-length encoding circuit 5, an average value of a quantization step size obtained from the quantization step size determining circuit 12) and a given data rate. To be concrete, as shown in the prior art, respective global complexity measures $X_I$, $X_P$ and $X_B$ of an I picture, a P picture and a B picture are determined according to the aforementioned formulas (1) through (3), and allocations of target bits $T_I$, $T_P$ and $T_B$ to images to be encoded are determined by calculating the aforementioned formulas (4) through (6) for I picture, P picture and B picture. Here, at the beginning of encoding, fixed initial values are set for the respective global complexity measures $X_I$, $X_P$ and $X_B$.

The reference quantization step size determining circuit 11 determines a reference quantization step size of an orthogonal transformation coefficient per MB based upon a number of generated bits up to the previous MB obtained from the variable-length encoding circuit 5 and a number of bits allocated by the bit allocating circuit 10. For example, in the case of I picture, a virtual buffer fullness $d_j^I$ in the j-th MB of the I picture is decided according to the aforementioned formula (7), and a reference quantization step size $q_j^I$ is determined per MB according to the aforementioned formula (8). Furthermore, also in the case of P picture and B picture, reference quantization widths $q_j^P$ and $q_j^B$ of j-th MB are determined in the same manner as in the case of I picture. Here, at the beginning of encoding, initial buffer fullness $d_o^I$, $d_o^P$ and $d_o^B$ of respective pictures (I picture, P picture and B picture) are initialized.

The quantization step size determining circuit 12 calculates an activity for each MB which shows fineness of a picture in a MB obtained from the block dividing circuit 1, a reference quantization step size is changed by the activity per MB so as to determine a quantization step size which is used in the quantizing circuit 4 per MB. For example, in the case of I picture, a quantization step size $Q_j^I$ of j-th MB of the I picture is determined according to the aforementioned formula (9). Moreover, also in the case of P picture and B picture, quantization widths $Q_j^P$ and $Q_j^B$ of j-th MB are determined in the same manner as in the case of the I picture. Here, at the beginning of encoding, an average value (avg) of the activities of the previously encoded frame is initialized.

Here, in the present embodiment, the bit allocating circuit 10, the reference quantization step size determining circuit 11 and the quantization step size determining circuit 12 constitute encoded data amount control means.

The dummy data generator 17, the switch 18 and the controller 19 realizes prevention of underflow in the buffer 6 which is one of the objects of the present invention.

The controller 19 monitors a number of occupied bits in the buffer 6 (a number of bits of encoded data which remain in the buffer 6 in the case where the encoded data are outputted at a constant data rate after each image frame is immediately encoded and the encoded data are immediately stored in the buffer 6 in the image encoding apparatus) and switches the switch 18 to an input terminal 18a side so that the output of the buffer 6 becomes an output of the image encoding apparatus (encoded data) in the case where a number of occupied bits exceeds a fixed value Th1, and switches the switch 18 to an input terminal 18b side so that an output of the dummy data generator 17 becomes the output of the image encoding apparatus in the case where a number of occupied bits is below the fixed value Th1.

Figure 13:
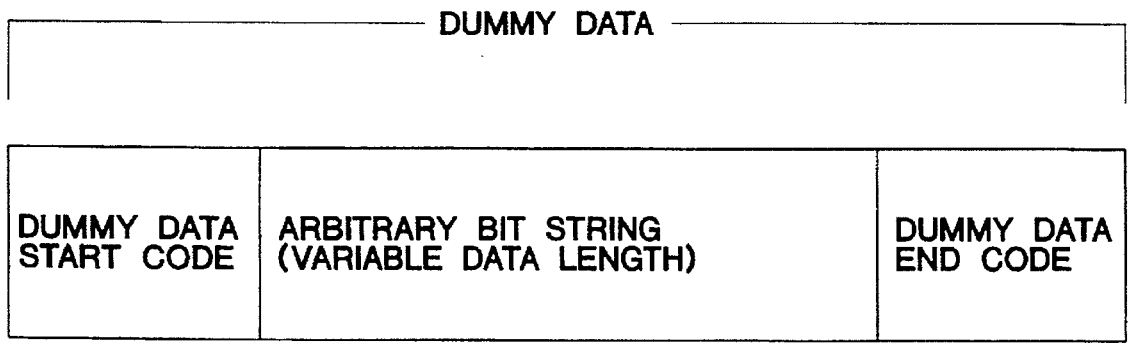
FIG. 13 is an explanatory drawing which shows a format of dummy data generated from a dummy data generator in the image encoding apparatus shown in FIG. 1.

The dummy data generator 17 generates dummy data which can be discriminated on a decoder side, not shown, and be eliminated. For example, in the case where "dummy data start code" and "dummy data end code" are provided in a variable-length code list and when the switch 18 is switched to the dummy data generator 17 side, the dummy data generator 17 generates an arbitrary bit string (however, the bit string does not form "dummy data end code") successively after generating "dummy data start code", and generates "dummy data end code" just before the switch 18 is switched to the buffer 6 side. A format of the dummy data is shown in FIG. 13.

Figure 14:
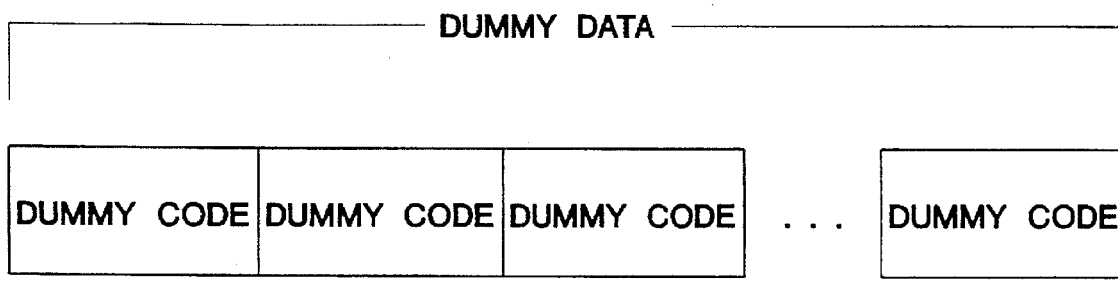
FIG. 14 is an explanatory drawing which shows another format of the dummy data generated from the dummy data generator in the image encoding apparatus shown in FIG. 1.

Or, a dummy code composed of a plurality of bits is set, and while the switch 18 is on the dummy data generator 17 side, the dummy data generator 17 may generate successively the above kind of the dummy codes. A format of the dummy data is shown in FIG. 14.

Figure 15:
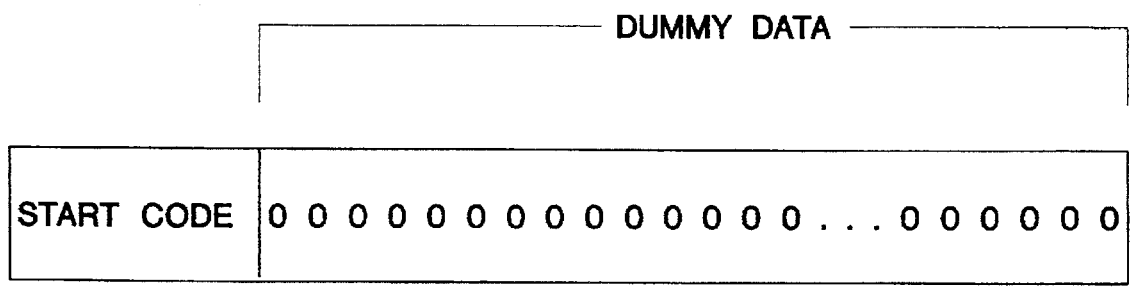
FIG. 15 is an explanatory drawing which shows still another format of the dummy data generated from the dummy data generator in the image encoding apparatus shown in FIG. 1.

Or, "start code" is always inserted into the front of each frame. In the case of a encoding system which is capable of inserting bits, an arbitrary number of "0"s just after the "start code" (namely, a system where on the image encoding apparatus side, the "start code" is always inserted into the front of encoded data of each frame, and on the decoder side, bits "0" just after the "start code" (bit string) are eliminated), the controller 19 and the dummy data generator 17 may have the following functions. Namely, the controller 19 checks whether or not the "start code" is inputted from the variable-length encoding circuit 5 to the buffer 6, and monitors a number of occupied bits in the buffer 6 when the "start code" is inputted to the buffer 6. When a number of occupied bits in the buffer 6 is below a determined value Th1 and the "start code" is outputted from the buffer 6, the switch 18 is switched to the dummy data generator 17 side, and when not, switched to the buffer 6 side. The dummy data generator 17 successively generates bits "0" (successively outputs the same bits). In this manner, a plurality of bits "0" continuously exist just after the "star code" in the encoded data, but they can be eliminated on the decoder side. A format of the dummy data is shown in FIG. 15.

The following will discuss an operation of the image encoding apparatus having the above arrangement.

First, in the block dividing circuit 1, a frame to be encoded is divided into MBs, and intra-frame encoding or inter-frame encoding is performed per MB. In the case of the intra-frame encoding, two-dimensional orthogonal transformation is carried out on the MBs from the block dividing circuit 1 by the orthogonal transforming circuit 3, whereas in the case of the inter-frame encoding, two-dimensional transformation is carried out on a difference (prediction difference) between the MBs from the block dividing circuit 1 and prediction MBs from the motion compensation inter-frame predicting circuit 2 by the orthogonal transforming circuit 3.

Next, in the quantizing circuit 4, a result of the two-dimensional orthogonal transformation by the orthogonal transform circuit 3 (transformation coefficient) is quantizing by a quantization step size obtained in the quantization step size determining circuit 12. After that, in the variable-length encoding circuit 5, variable-length encoding is performed on the quantized transform coefficient and the encoded data are temporarily stored in the buffer 6.

The controller 19 monitors a number of occupied bits in the buffer 6, and when the number of occupied bits in the buffer 6 exceeds a threshold Th1, a common output terminal of the switch 18 is connected to the input terminal 18a. In this case, the encoded data are outputted from the buffer 6 at a predetermined constant rate.

Figure 2:
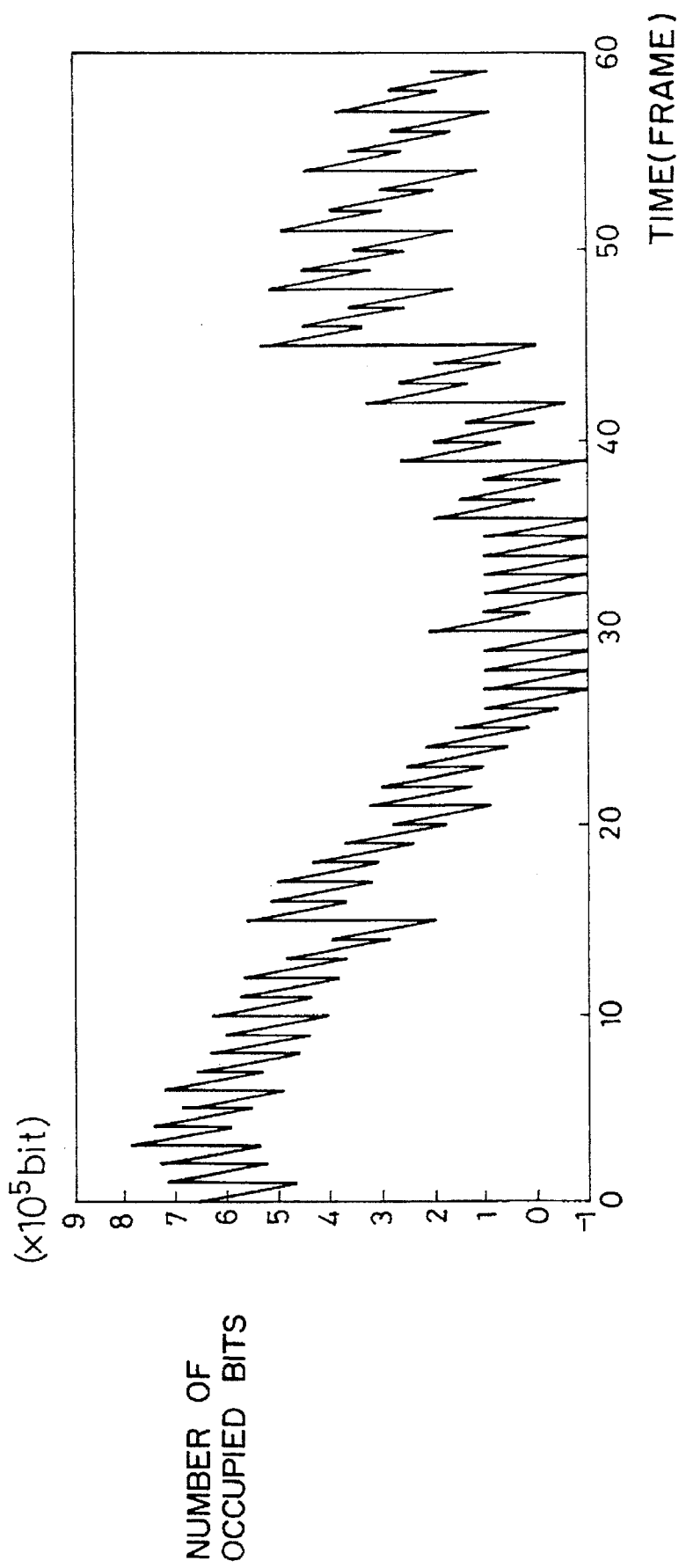
FIG. 2 is a graph which shows an aged change in a number of occupied bits in a buffer in the case where information corresponding to an image (image 3) which is shifted to a normal motion picture after frequent scene changes continue for 30 frames is encoded by the image encoding apparatus shown in FIG. 1.

FIG. 2 shows a number of occupied bits in the buffer 6 in the case where an image 3 is encoded by the image encoding apparatus of the present embodiment (image that is shifted to a normal motion picture after frequent scene changes for continuous 30 frames). In this example, a threshold Th1 which changes the switch 18 is $-10^5$ bits.

In this case, the number of occupied bits in the buffer 6 is not more than the threshold Th1 at about time 27, and the switch 18 is switched to the dummy data generator 17 side by the controller 19 which monitors the number of occupied bits in the buffer 6. Therefore, from the image encoding apparatus, instead of the encoded data read out from the buffer 6, dummy data from the dummy data generator 17 are outputted. While the switch 18 is on the dummy data generator 17 side, transmission of the encoded data in the buffer 6 is temporarily suspended, so the number of occupied bits in the buffer 6 does not become smaller than the threshold Th1.

While the switch 18 is on the dummy data generator 17 side, the encoded data from the variable-length encoding circuit 5 are stored in the buffer 6. If a number of occupied bits in the buffer 6 exceeds the threshold Th1, the switch 18 is switched to the buffer 6 side by the controller 19, and the encoded data are again outputted from the buffer at a constant data rate.

Thereafter, as mentioned above, if a number of occupied bits in the buffer 6 is not more than the threshold Th1, an output of the image encoding apparatus becomes dummy data of the dummy data generator 17, and if a number of occupied bits in the buffer 6 exceeds the threshold Th1, the encoded data are outputted from the buffer 6 at a constant data rate. For this reason, a lower limit of a number of occupied bits in the buffer 6 can be limited substantially to the threshold Th1, thereby making it possible to prevent underflow of the buffer 6.

Here, allowing a number of occupied bits to be a minus value corresponds to specifying an origin of the occupied bits in the following manner. Namely, in the initial state, dummy data which can be eliminated on the decoder side are stored in the buffer 6, and a number of occupied bits at this time is defined as 0. Therefore, the threshold Th1 is allowed to be set to a smaller value than a number of occupied bits in the buffer 6 in the initial state. Generally, also in the case of a normal image, the rate control (control over an amount of generation of encoded data) is not accurate, namely, slight fluctuation occurs. However, when the threshold Th1 is set to 0, even in the case where the rate control is slightly inaccurate, the switch 18 is switched to the dummy data generator 17 side and the dummy data are added to the encoded data. Reason for setting the threshold Th1 to a minus is to avoid the addition of such dummy data.

Here, only if a lot of dummy data are stored in the buffer 6 and an origin is set so that a number of occupied bits become a great minus value in the early state, the problem of underflow mentioned in problems to be solved by the invention cannot be essentially dissolved. The reason is that, for example, in a sequence where deep black images continue for a long time, the encoded data are hardly generated, so an amount of dummy data which is stored in the buffer 6 at the beginning should be greatly increased. In this case, since capacity of the buffer 6 should be enlarged greatly, there arises a problem that scale of hardware increases. Furthermore, in a sequence of an image 2 (an image which is shifted to a normal motion picture after stop motion continues for 30 frames) or the image 3, the underflow can be prevented, but a problem that quality of the image is considerably deteriorated at that time cannot be dissolved.

Therefore, an operation for obtaining minus values for a number of occupied bits in the buffer 6 absorbs slight fluctuation of the rate control in a normal sequence so that unnecessary addition of the dummy data by the dummy data generator 17 in the present embodiment is prevented. However, needless to say, the threshold Th1 may be 0 as well as a positive value. In the case particularly where the fluctuation of the rate control in the normal sequence is small, the threshold Th1 may be 0 as well as a positive value.

Figure 17:
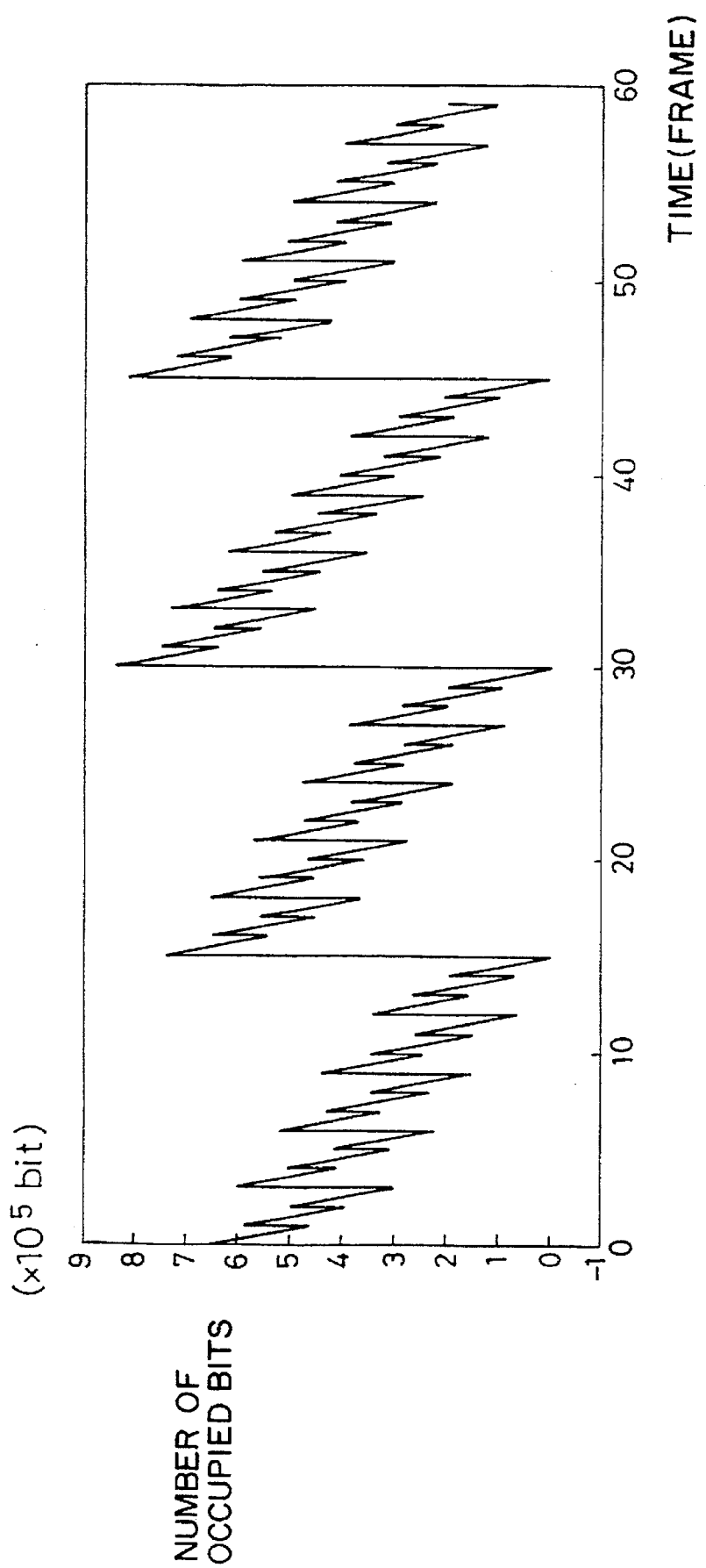
FIG. 17 is a graph which shows an aged change in a number of occupied bits in a buffer in the case where a typical motion picture is encoded by the image encoding apparatus.

Here, in the case where a normal motion picture (image 1) in which a stop motion and frequent scene change do not continue for a plurality of frames is encoded by the image encoding apparatus of the present embodiment, a number of occupied bits in the buffer 6 seldom becomes not more than the threshold Th1, so similarly to the conventional image encoding apparatus, a change in a number of occupied bits in the buffer 6 with time is shown in FIG. 17.

As mentioned above, the image encoding apparatus of the present embodiment is arranged so as to have:

the quantizing circuit 4 as quantizing means for quantizing orthogonal transform coefficient as information corresponding to image information;

the variable-length encoding circuit 5 as the variable-length encoding means for performing variable-length encoding on the quantized result;

the buffer 6 as temporary storage means for temporarily storing encoded data from the variable-length encoding circuit 5 so as to transmit the encoded data, which have been stored, outside at a fixed data rate;

the encoded data amount control means (bit allocating circuit 10, reference quantization step size determining circuit 11 and quantization step size determining circuit 12)

for calculating a quantization step size of information to be encoded based upon the encoded result of the variable-length encoding circuit 5 adjusting the quantization step size for quantization in the quantizing circuit 4 according to the calculated result so as to control an amount of the encoded data;

the dummy data generator 17 as dummy data generating means for generating dummy data which can be eliminated on the decoding circuit which decodes the encoded data;

the switch 18 as switching means for switching an output of the image encoding apparatus to either the encoded data from the buffer 6 or the dummy data from the dummy data generator 17; and the controller 19 as control means for monitoring a number of occupied bits in the buffer 6 so as to control the switch operation of the switch 18 such that the output of the image encoding apparatus becomes the encoded data from the buffer 6 when a number of occupied bits exceeds the predetermined threshold Th1 and that the output of the image encoded apparatus becomes the dummy data from the dummy data generator 17 when a number of occupied bits is not more than the threshold Th1.

With the above arrangement, when a number of occupied bits in the buffer 6 becomes smaller than the threshold Th1, the dummy data from the dummy data generator 17 are outputted from the image encoded apparatus instead of the encoded data read out from the buffer 6. Since while the dummy data are being outputted, transmission of the encoded data in the buffer 6 is temporarily suspended, a lower limit of a number of occupied bits in the buffer 6 can be limited to the threshold Th1, thereby making it possible to prevent the underflow of the buffer 6.

[EMBODIMENT 2]

Figure 4:
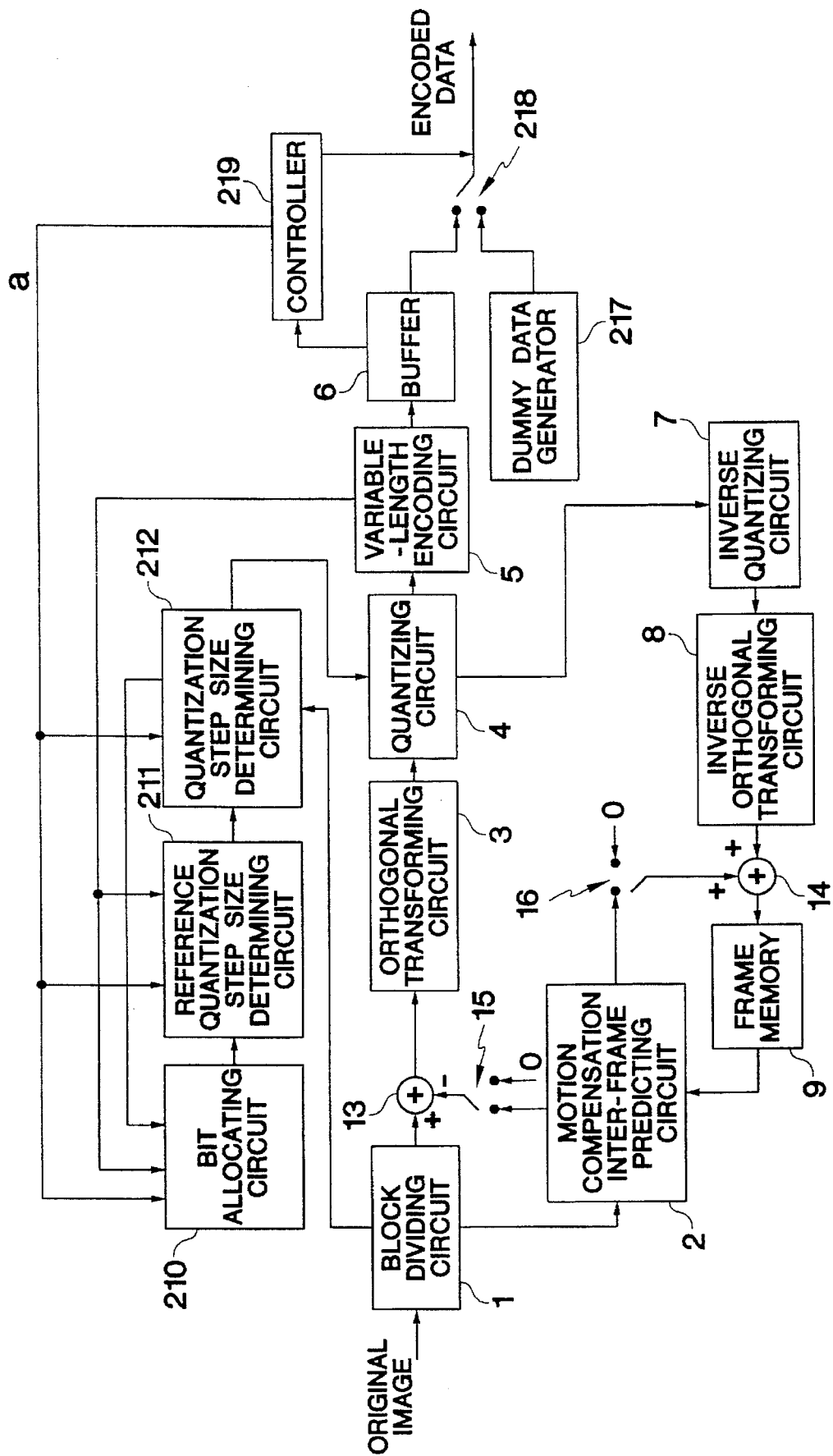
FIG. 4 is a block diagram which shows an arrangement of a main circuit in an image encoding apparatus of the second embodiment of the present invention.
Figure 5:
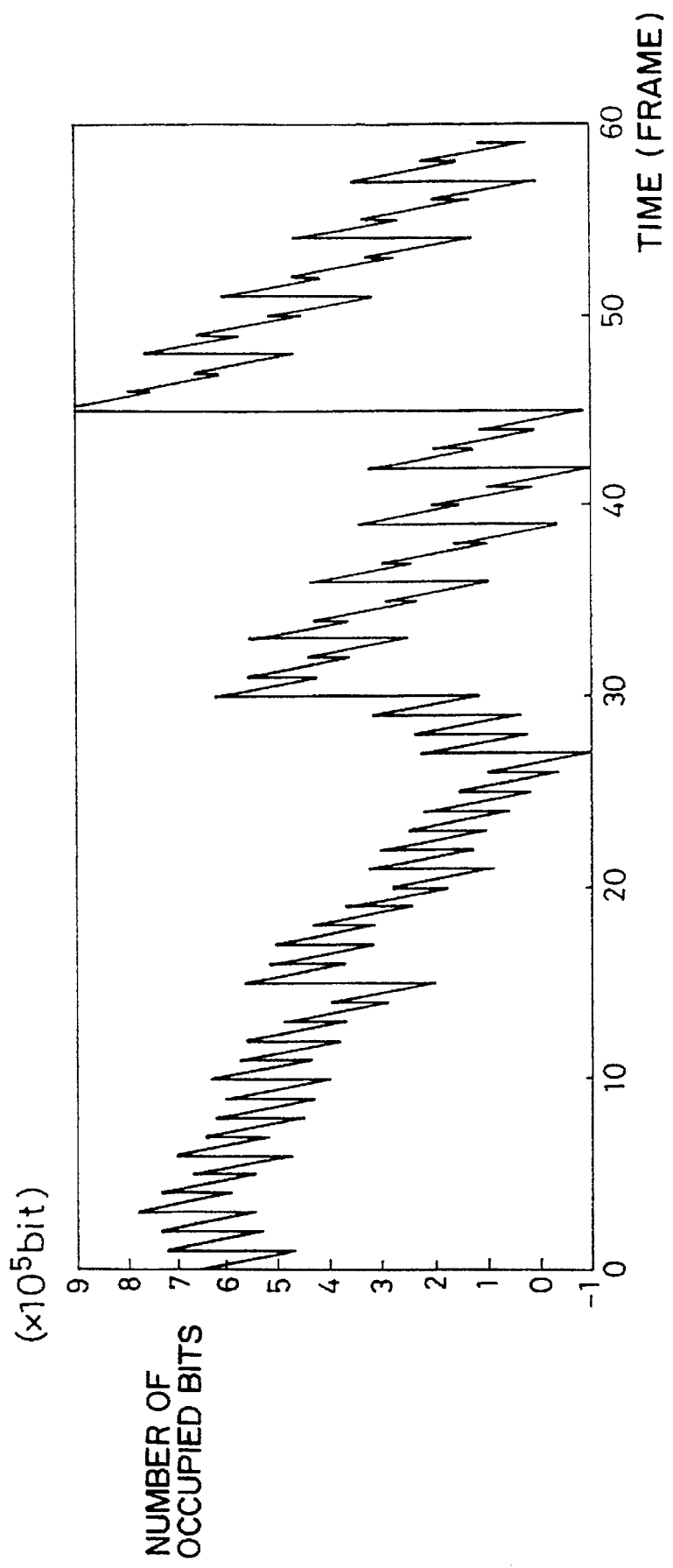
FIG. 5 is a graph which shows an aged change in a number of occupied bits in a buffer in the case where information corresponding to the image 3 is encoded by the image encoding apparatus shown in FIG. 4.

Next, the following will discuss another embodiment of the present invention in detail mainly referring to FIGS. 4 and 5.

Here, for convenience of explanation, those members of the present embodiment that have the same arrangement and function, and that are mentioned in the above example, are indicated by the same reference numerals and the description thereof is omitted.

Similar to the aforementioned embodiment 1, the present embodiment controls underflow of a buffer. According to the embodiment 1, underflow of a buffer in an image encoding apparatus can be prevented, but since the encoded data stored in the buffer are increased by inserting dummy data despite actual little generation of the encoded data, various parameters which are used for the rate control (controlling an amount of generation of the encoded data) lose their balance. For example, since global complexity measures $X_I$, $X_P$ and $X_B$ in I picture, P picture and B picture are calculated from a number of generated bits and an average quantization step size of I picture, P picture and B picture, if the dummy data are inserted into the encoded data, the global complexity measures become meaningless values. For this reason, in an example shown in FIG. 2, Just after the frequent scene change is shifted to a normal motion picture (just after time 30), rate control is unstable, so it takes too time to return to the normal state which is shown in FIG. 17. Actually, turbulence in quality of an image can be seen. The present embodiment dissolves these problems.

FIG. 4 shows an arrangement of the main portion of the image encoding apparatus according to the present embodiment. A block dividing circuit 1, a motion compensation inter-frame predicting circuit 2, an orthogonal transforming circuit 3, a quantizing circuit 4, a variable-length encoding circuit 5, a buffer 6, an inverse quantizing circuit 7, an inverse orthogonal transforming circuit 8, a frame memory 9, a subtracter 13, an adder 14, a switch 15 and a switch 16 in the image encoding apparatus of the present embodiment that have the same arrangement and functions, and that are mentioned in the above embodiment 1 are indicated by the same reference numerals and the description thereof is omitted.

A bit allocating circuit 210, a reference quantization step size determining circuit 211, a quantization step size determining circuit 212, a dummy data generator 217 as dummy data generating means, a switch 218 as switching means and a controller 219 as control means in the image encoding apparatus of the present embodiment adopt the method of the present invention so as to prevent underflow in the buffer 6 of the image encoding apparatus, and have a function for keeping good quality of an image.

The bit allocating circuit 210, the reference quantization step size determining circuit 211, the quantization step size determining circuit 212, the dummy data generator 217, the switch 218 and the controller 219 basically have same functions as those of the the bit allocating circuit 10, the reference quantization step size determining circuit 11, the quantization step size determining circuit 12, the dummy data generator 17 and the switch 18 and the controller 19 of the aforementioned embodiment 1 which are shown in FIG. 1, but in the present embodiment, the following operations are further added.

In other words, the controller 219 switches the switch 218 to the dummy data generator 217 side and simultaneously transmits a switch signal a which shows this operation to the bit allocating circuit 210, the reference quantization step size determining circuit 211 and the quantization step size determining circuit 212.

In the bit allocating circuit 210, the reference quantization step size determining circuit 211 and the quantization step size determining circuit 212, when the switch signal a is inputted from the controller 219, a parameter which is used for the rate control is initialized. In other words, when the switch signal a is inputted to the bit allocating circuit 210, the global complexity measures $X_I$, $X_P$ and $X_B$ of each picture (I picture, P picture and B picture) are initialized (set to an initial value). Moreover, when the switch signal a is inputted to the reference quantization step size determining circuit 211, initial buffer fullness $d_0^I$, $d_0^P$, $d_0^B$ of each picture (I picture, P picture and B picture) are initialized (set to an initial value). Furthermore, when the switch signal a is inputted to the quantization step size determining circuit 212, an average value avg of the activities in the previous frame is initialized (set to an initial value).

Here, in the present embodiment, the bit allocating circuit 210, the reference quantization step size determining circuit 211 and the quantization step size determining circuit 212 constitute the encoded data amount control means.

With the above arrangement, the following will discuss an operation of the image encoding apparatus of the present embodiment.

As mentioned in the aforementioned embodiment 1, the controller 219 monitors a number of occupied bits in the buffer 6 and judges whether or not the number of occupied bits in the buffer 6 exceeds the threshold Th1. When the number of occupied bits in the buffer 6 exceeds the threshold Th1, the controller 219 switches the switch 218 to the buffer 6 side and encoded data are outputted from the buffer 6 at a predetermined constant data rate.

FIG. 5 shows a number of occupied bits in the buffer 6 in the case where an image 3 (an image which is shifted to a normal motion picture after frequent scene change continues for 30 frames) is encoded by the image encoding apparatus of the present embodiment. Also in this case, the threshold Th1 which switches the switch 218 is $-10^5$ bits.

In this case, the number of occupied bits in the buffer 6 becomes not more than the threshold Th1 at about time 27. Then, the switch 218 is switched to the dummy data generator 217 side by the controller 219 which monitors the number of occupied bits in the buffer 6 and at the same time, the switch signal a is outputted from the controller 219 to the bit allocating circuit 210, the reference quantization step size determining circuit 211 and the quantization step size determining circuit 212.

Therefore, dummy data from the dummy data generator 217 are outputted from the image encoding apparatus instead of the encoded data read out from the buffer 6, and while the dummy data is being outputted, transmission of the encoded data in the buffer 6 is suspended, so the number of occupied bits in the buffer 6 does not become less than the threshold Th1. Moreover, when an output of the dummy data is started, a parameter which is used for the rate control is initialized in the bit allocating circuit 210, the reference quantization step size determining circuit 211 and the quantization step size determining circuit 212. For this reason, even when the dummy data are inserted into the encoded data, the parameter for the rate control, which is used for calculating a quantization step size, can keep its balance.

While the switch 218 is on the dummy data generator 217 side, the encoded data from the variable-length encoding circuit 5 are stored in the buffer 6. If the number of occupied bits in the buffer 6 exceeds the threshold Th1, the switch 218 is switched to the buffer 6 side by the controller 219 and the encoded data are again outputted from the buffer 6 at a constant data rate.

Subsequently, in the same manner as in the above, if the number of occupied bits in the buffer 6 becomes not more than the threshold Th1, transmission of the encoded data stored in the buffer 6 is suspended so that the dummy data are outputted instead of the encoded data and a parameter which is used for the rate control is initialized. Thereafter, if the number of occupied bits in the buffer 6 exceeds the threshold Th1, the encoded data are outputted from the buffer 6 at a constant rate. For this reason, a lower limit of the number of occupied bits in the buffer 6 can be substantially limited to the threshold Th1. As a result, the underflow of the buffer 6 can be prevented and also the parameter for the rate control during the insertion of the dummy data can keep its balance.

It is apparent from FIG. 5 that the underflow of the buffer 6 can be prevented, and the normal rate control is worked just after the image is shifted to the normal motion picture. In other words, in the aforementioned embodiment 1, as shown in FIG. 2, the number of occupied bits in the buffer 6 becomes repeatedly not more than the threshold Th1 even after time 30, and the dummy data are inserted by the present invention. However, in the present embodiment, as shown in FIG. 5, a configuration of the graph just after time 30 is same as that of the normal motion picture (FIG. 17), namely, it is returned to a normal state.

Similarly to the image encoding apparatus of the embodiment 1, the image encoding apparatus of the present embodiment is arranged so as to have:

the dummy data generator 217 as dummy data generating means for generating dummy data which can be eliminated on the decoding circuit which decodes encoded data;

the switch 218 as switching means for switching an output of the image encoding apparatus to either the encoded data from the buffer 6 or the dummy data from the dummy data generator 217; and the controller 219 as control means for monitoring a number of occupied bits in the buffer 6 and controlling the switching operation of the switch 218 so that the output of the image encoding apparatus becomes the encoded data from the buffer 6 when a number of occupied bits exceeds the predetermined threshold Th1 and that the output of the image encoded apparatus becomes the dummy data from the dummy data generator 217 when a number of occupied bits is not more than the threshold Th1. Furthermore, the image encoding apparatus of the present embodiment is arranged so that when the number of occupied bits in the buffer 6 is not more than the threshold Th1, the switch signal a is outputted to the bit allocating circuit 210, the reference quantization step size determining circuit 211 and the quantization step size determining circuit 212 as the encoded data amount control means by the controller 219, and when the switch signal a is inputted, the bit allocating circuit 210, the reference quantization step size determining circuit 211 and the quantization step size determining circuit 212 initialize various parameters for the rate control (various parameters which are used for calculating a quantization step size).

With the above arrangement, the underflow of the buffer 6 can be prevented in the same way as in the embodiment 1, and even when the dummy data are outputted instead of the actual encoded data, various parameters which are used for the rate control keep their balance and the constant rate control can be realized, thereby making it possible to code image information with good quality.

[EMBODIMENT 3]

Figure 6:
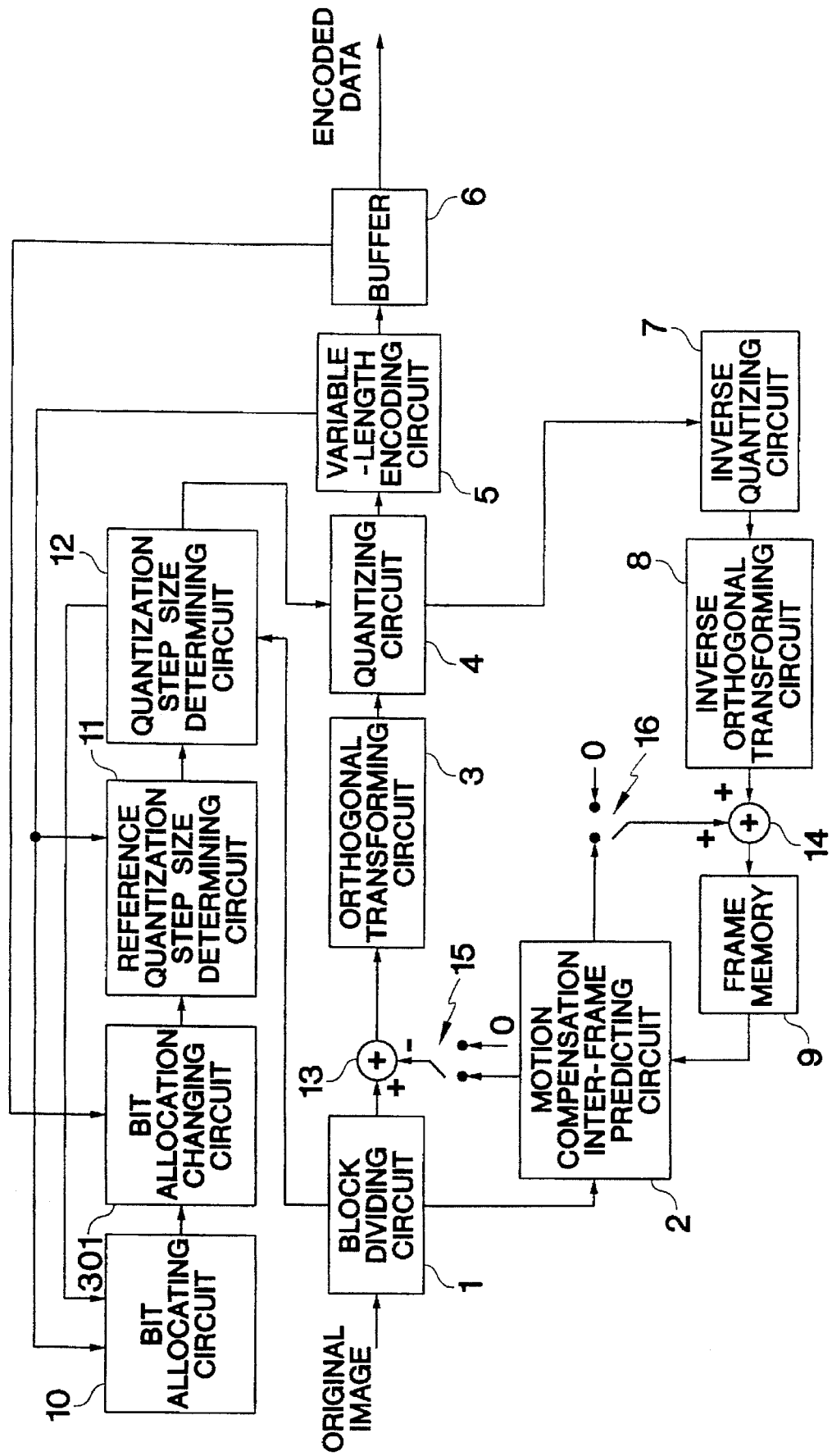
FIG. 6 is a block diagram which shows an arrangement of a main circuit in an image encoding apparatus of the third embodiment of the present invention.
Figure 7:
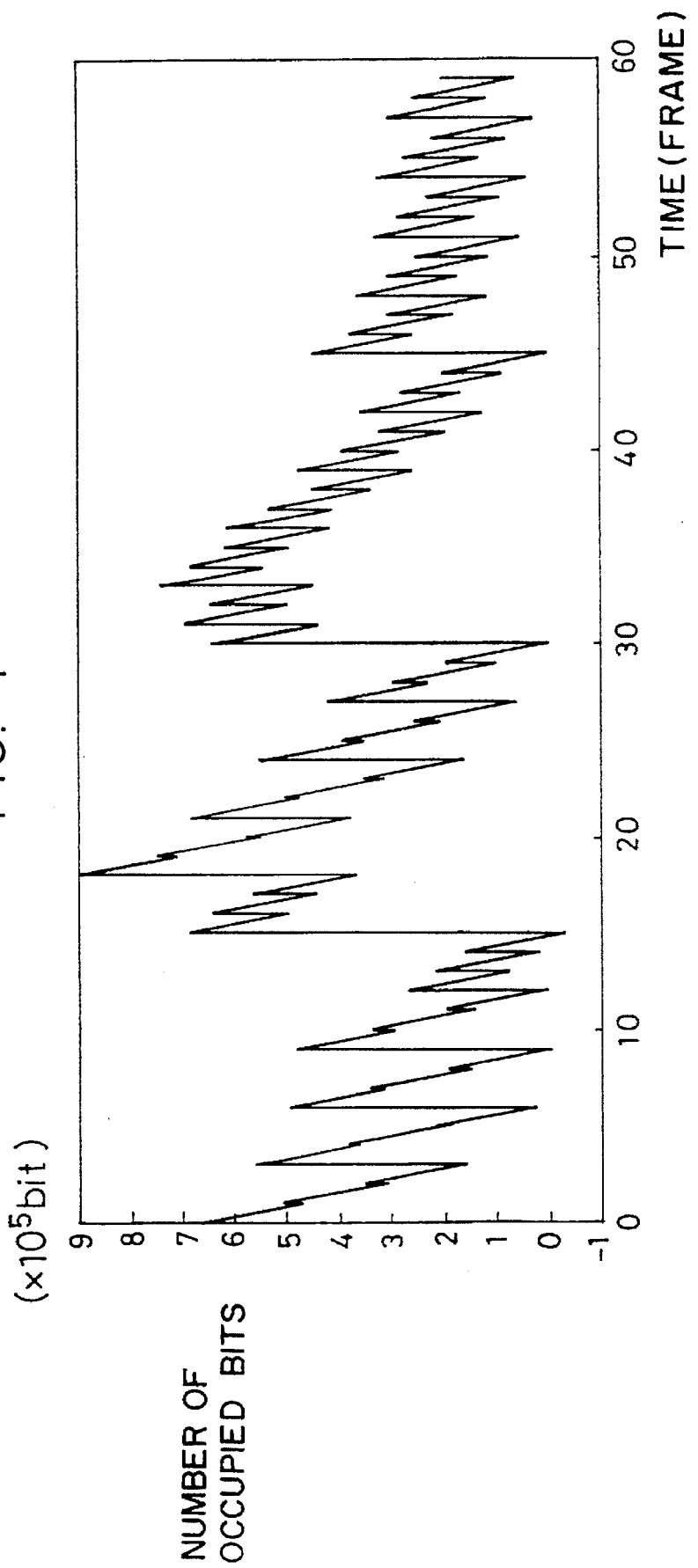
FIG. 7 is a graph which shows an aged change in a number of occupied bits in a buffer in the case where information corresponding to an image (image 2) which is shifted to a normal motion picture after stop motion continues for 30 frames is encoded by the image encoding apparatus shown in FIG. 6.

Next, the following will discuss a third embodiment of the present invention mainly referring to FIGS. 6 and 7.

Here, for convenience of explanation, those members of the present embodiment that have the same arrangement and function, and that are mentioned in the above embodiments are indicated by the same reference numerals and the description thereof is omitted.

The image encoding apparatus of the present embodiment controls overflow of a buffer which is one of the problems in the prior arts, and an arrangement of its main circuit is shown in FIG. 6.

The block dividing circuit 1, the motion compensation inter-frame predicting circuit 2, the orthogonal transforming circuit 3, the quantizing circuit 4, the variable-length encoding circuit 5, the buffer 6, the inverse quantizing circuit 7, the inverse orthogonal transforming circuit 8, the frame memory 9, the bit allocating circuit 10, the reference quantization step size determining circuit 11, the quantization step size determining circuit 12, the subtracter 13, the adder 14, the switch 15 and the switch 16 in the image encoding apparatus of the present embodiment that have the same arrangement and functions, and that are mentioned in the above embodiment 1 are indicated by the same reference numerals and the description thereof is omitted.

The image encoding apparatus of the present embodiment includes a bit allocation changing circuit 301 as bit allocation changing means in order to prevent overflow of a buffer. When bit allocation $T_I$ (in the case of I picture), $T_P$ (in the case of P picture) or $T_B$ (in the case of B picture) is inputted from a bit allocating circuit 10, the bit allocation changing circuit 301 inspects a number of occupied bits in a buffer 6 and changes the bit allocation so that a sum of the number of occupied bits in the buffer 6 and the bit allocation $T_I$, $T_P$ or $T_B$ for a frame to be encoded does not exceed a predetermined fixed value.

In other words, when the bit allocation $T_I$ (in the case of I picture), $T_P$ (in the case of P picture) or $T_B$ (in the case of B picture) for a frame is inputted from the bit allocating circuit 10, a check is made as to whether or not conditions of the following formulas (11) through (13) are satisfied in the bit allocation changing circuit 301.

$$BO+T_I > ThI \text{ (in the case of I picture)} \quad (11)$$

$$BO+T_P > ThP \text{ (in the case of P picture)} \quad (12)$$

$$BO+T_B > ThB \text{ (in the case of B picture)} \quad (13)$$

Here, in the formulas (11) through (13), BO is a number of occupied bits in the buffer 6, and ThI, ThP or ThB is a threshold which is determined for each picture.

When the conditions of the formulas (11) through (13) are not satisfied, the bit allocation changing circuit 301 outputs a value of the bit allocation, whereas when the conditions of the formulas (11) through (13) are satisfied, the bit allocation changing circuit 301 changes the values of the bit allocation $T_I$ (in the case of I picture), $T_P$ (in the case of P picture) or $T_B$ (in the case of B picture) are changed according to the following formulas (14) through (16).

$$T_I = ThI - BO \text{ (in the case of I picture)} \quad (14)$$

$$T_P = ThP - BO \text{ (in the case of P picture)} \quad (15)$$

$$T_B = ThB - BO \text{ (in the case of B picture)} \quad (16)$$

With the above arrangement, the following will discuss an operation of the image encoding apparatus of the present embodiment.

Every time when encoding of one frame is completed, in the bit allocating circuit 10, a number of bits which are allocated to a frame to be encoded, namely, the bit allocation $T_I$ (in the case of I picture), $T_P$ (in the case of P picture) or $T_B$ (in the case of B picture) is calculated according to encoded results up to the previous frame (a number of generated bits obtained from the variable-length encoding circuit 5 and an average value of a quantization step size obtained from the quantization step size determining circuit 12), and the calculated value is outputted to the bit allocation changing circuit 301.

When the bit allocation is inputted, a check is made whether or not the conditions of the formulas (11) through (13) are satisfied in the bit allocation changing circuit 301. If the conditions are not satisfied, the value of the bit allocation is directly outputted to the reference quantization step size determining circuit 11, and if the conditions are satisfied, the value of the bit allocation is changed according to the formulas (14) through (16) and the changed bit allocation is outputted to the reference quantization step size determining circuit 11.

FIG. 7 shows a number of occupied bits in the buffer 6 in the case where an image 2 (an image which is shifted to a normal motion picture after stop motion continues for 30 frames) is encoded by the image encoding apparatus of the present embodiment. In this example, all thresholds ThI, ThP and ThB are set to $8 \times 10^5$.

In this case, since new GOP starts in a stop motion at time 15 and an I picture appears, the bit allocation TI which is calculated in the bit allocating circuit 10 becomes great unusually and $BO+T_I$ exceeds the threshold ThI. As a result, the condition of the formula (11) is satisfied. For this reason, the bit allocation changing circuit 301 changes the bit allocation according to the formula (14) so that $BO+T_I$ does not exceed the threshold ThI. Therefore, even if the I picture which appears at time 15 is encoded and stored to the buffer 6, the number of occupied bits in the buffer 6 does not considerably exceed the threshold ThI, so the overflow is prevented.

In addition, since generation of a lot of encoded data in an I picture which appears at time 15 are restrained, a number of remained bits in GOP can be secured, and an usual number of bits is allocated to the frames thereafter in the GOP. Therefore, it is also possible to restrain deterioration of quality of an image.

Figure 18:
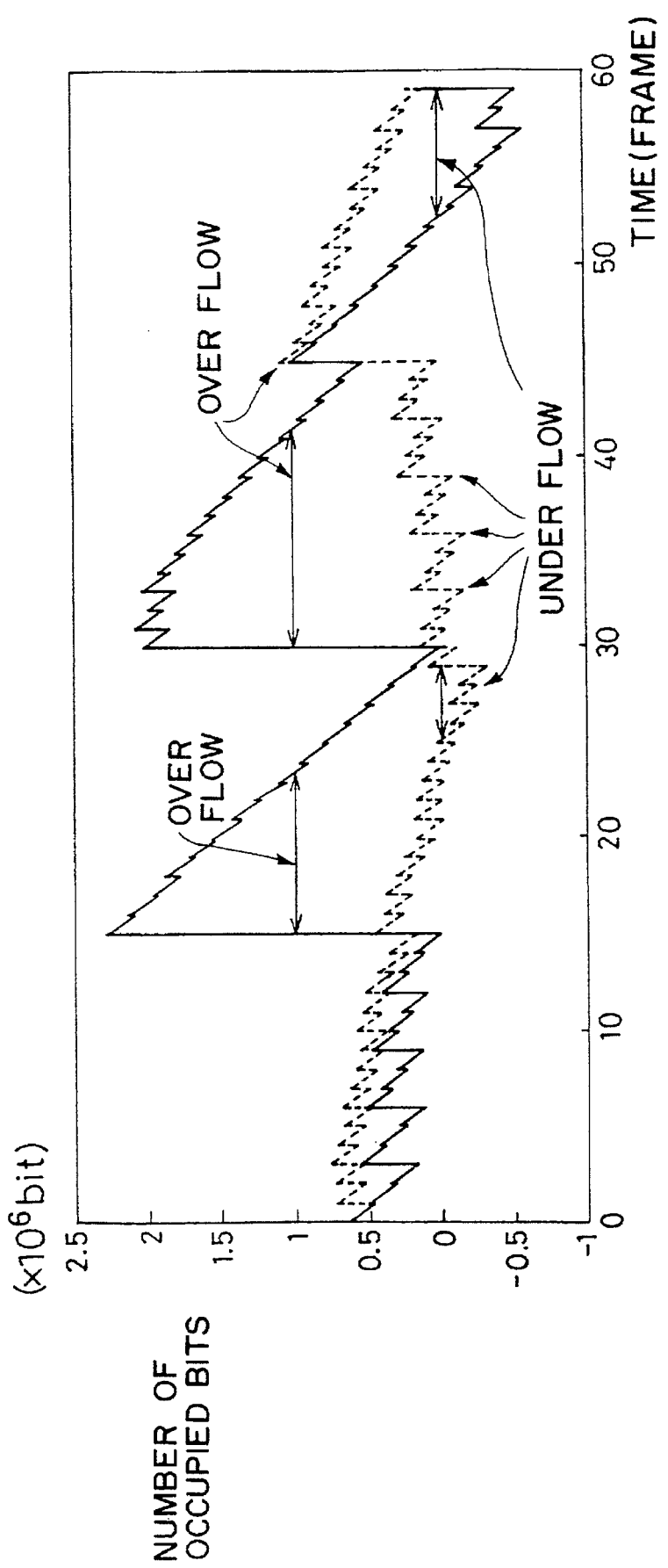
FIG. 18 is a graph which shows an aged change in a number of occupied bits in a buffer in the case where information corresponding to the image 2 and the image 3 is respectively encoded by the conventional image encoding apparatus.

Effects of prevention of the overflow are quite obvious by comparing the graphs (solid line) for the image 2 in FIGS. 7 and 18.

As mentioned above, the image encoding apparatus of the present invention is arranged so as to have the bit allocation changing circuit 301 as the bit allocation changing means for monitoring a number of occupied bits in the buffer 6 so as to change the calculated bit allocation when the sum of bit allocation to a frame which has been calculated before encoding and a number of occupied bits in the buffer 6 at the time of the calculation of bit allocation exceeds the predetermined threshold ThI, ThP or ThB, such that the sum does not exceed the threshold.

For this reason, even if information of the frame is encoded and stored to the buffer 6, a number of occupied bits in the buffer 6 at that time does not considerably exceed the thresholds, so if the thresholds are set to smaller values than a storage capacity of the buffer 6, the overflow can be prevented.

[EMBODIMENT 4]

Figure 8:
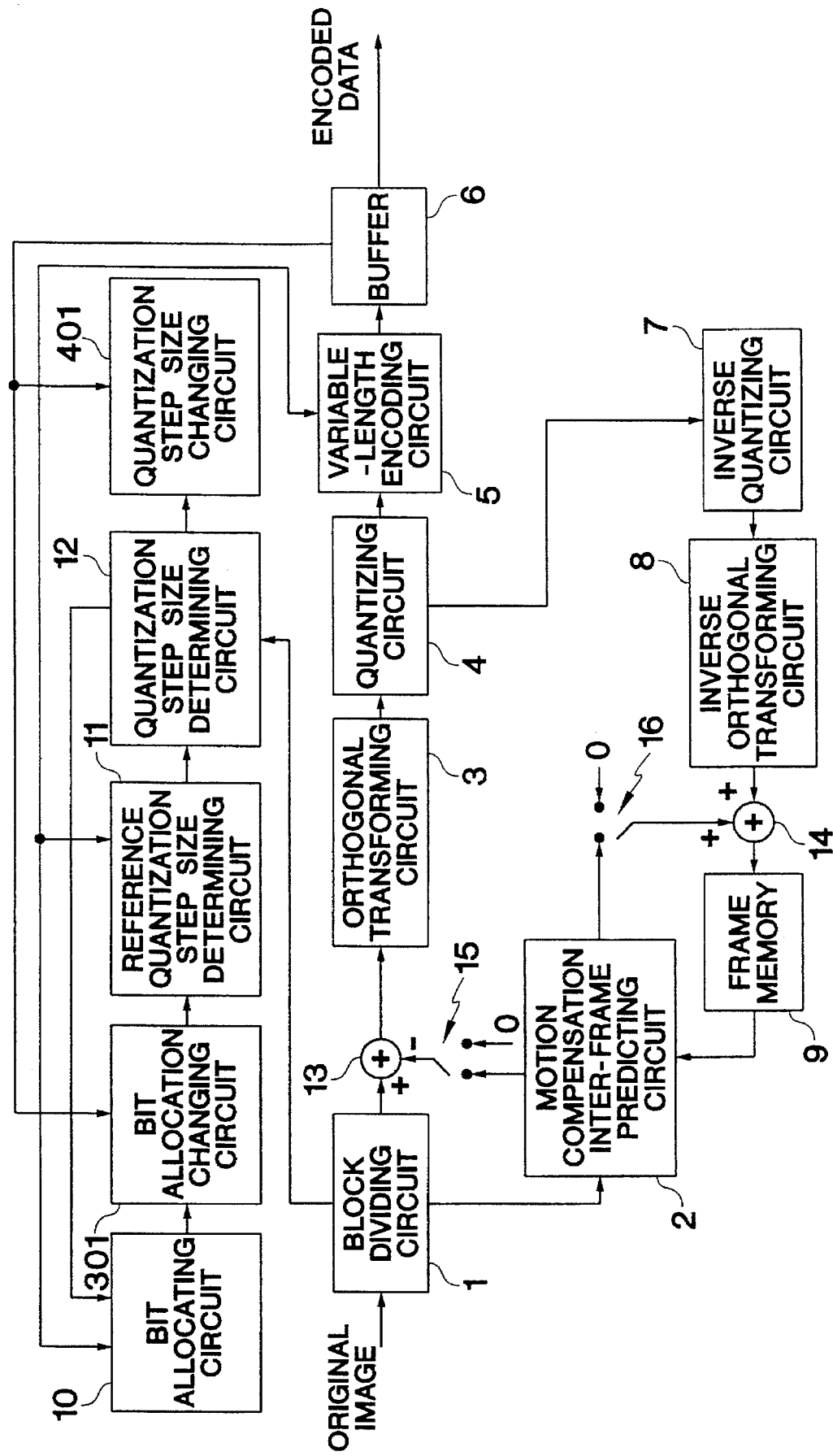
FIG. 8 is a block diagram which shows an arrangement of a main circuit in an image encoding apparatus of the fourth embodiment of the present invention.
Figure 9:
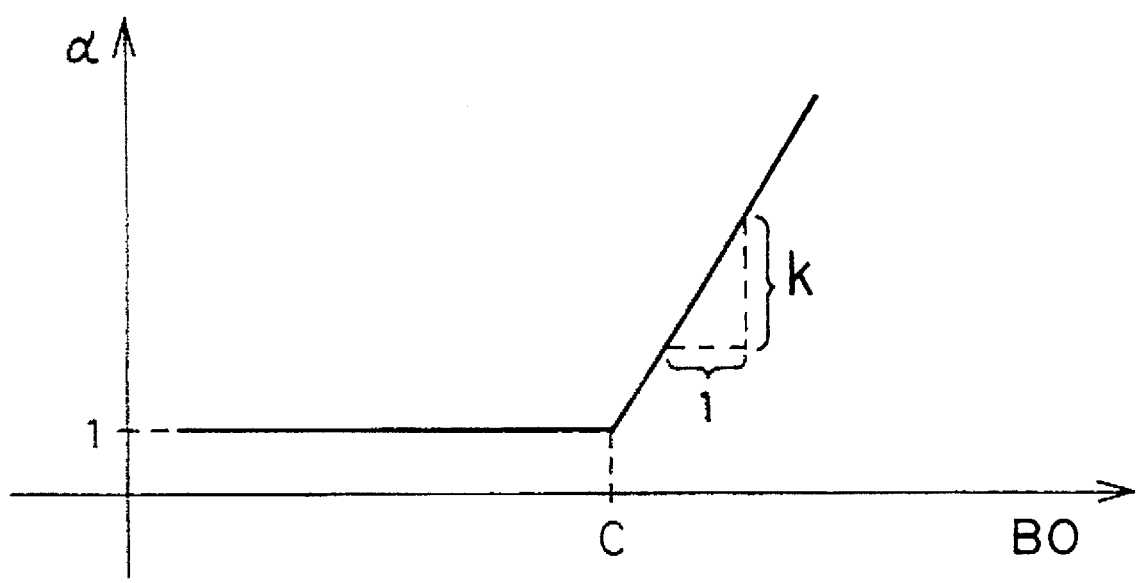
FIG. 9 is a graph which shows a relationship between a value α, which is multiplied by a quantization step size so as to change the quantization step size used for the image encoding apparatus shown in FIG. 8, and a number of occupied bits in a buffer BO.
Figure 10:
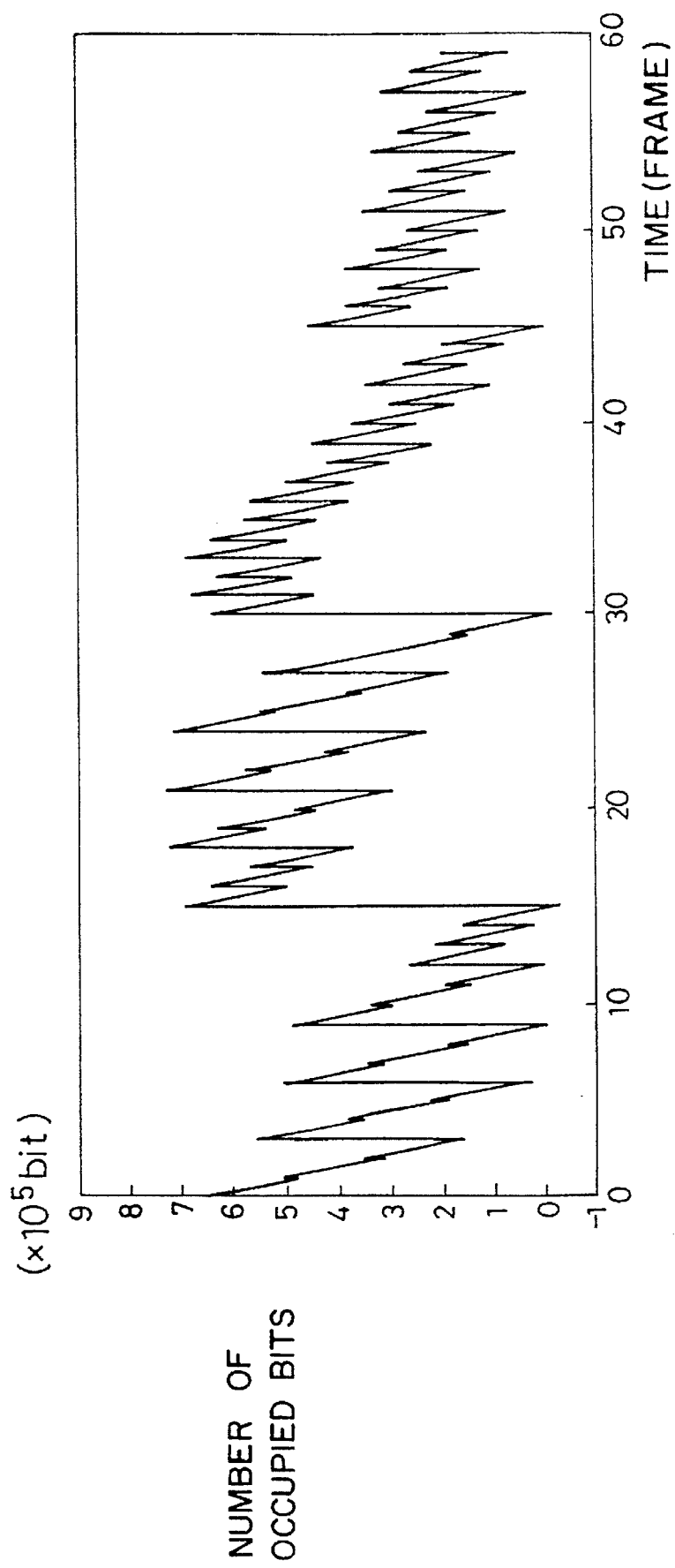
FIG. 10 is a graph which shows an aged change in a number of occupied bits in a buffer in the case where information corresponding to the image 2 is encoded by the image encoding apparatus shown in FIG. 8.

The following will discuss a fourth embodiment of the present invention mainly referring to FIGS. 8 through 10.

Here, for convenience of explanation, those members of the present embodiment that have the same arrangement and function, and that are mentioned in the above embodiments are indicated by the same reference numerals and the description thereof is omitted.

Similarly to the embodiment 3, the image encoding apparatus of the present embodiment also controls overflow of a buffer, but further improves the effects of the prevention of overflow in embodiment 3.

An arrangement of a main circuit in the image encoding apparatus of the present embodiment is shown in FIG. 8. A block dividing circuit 1, a motion compensation inter-frame predicting circuit 2, an orthogonal transforming circuit 3, a quantizing circuit 4, a variable-length encoding circuit 5, a buffer 6, an inverse quantizing circuit 7, an inverse orthogonal transforming circuit 8, a frame memory 9, a bit allocating circuit 10, a reference quantization step size determining circuit 11, a quantization step size determining circuit 12, a subtracter 13, an adder 14, a switch 15, a switch 16 and a bit allocation changing circuit 301 in the image encoding apparatus of the present embodiment that have the same arrangement and functions, and that are mentioned in the above embodiment 3 are indicated by the same reference numerals and the description thereof is omitted.

The image encoding apparatus of the present embodiment have a quantization step size changing circuit 401 as quantization step size changing means in order to effectively prevent overflow of the buffer 6. When data of a quantization step size are inputted from the quantization step size determining circuit 12, the quantization step size changing circuit 401 inspects a number of occupied bits in the buffer 6. If the number of occupied bits in the buffer 6 exceeds a predetermined threshold, the quantization step size changing circuit 401 changes the quantization step size, which has been determined in the quantization step size determining circuit 12, to a greater value.

In other words, the quantization step size changing circuit 401 changes the quantization step size by multiplying a value $\alpha$ shown in the following formula (17) or (18) by quantization widths $Q_j^I$, $Q_j^P$ and $Q_j^B$ in j-th MB of each picture which have been determined in the quantization step size determining circuit 12.

$$\alpha = 1 + k \; (BO-C) \; (\text{when } BO>C) \quad (17)$$

$$\alpha = 1 \; (\text{when } BO \leq C) \quad (18)$$

In the formula (17), k and C are constants (k>0, C>0). A relationship between $\alpha$ and a number of occupied bits BO is shown in FIG. 9. As shown in the example, $\alpha$ may linearly increase when BO is bigger than C but it is not limited to this. For example, $\alpha$ may be represented by a curve such that $\alpha$ gradually becomes bigger than 1 with an increase in BO when BO is smaller than C, and rapidly becomes bigger than 1 when BO exceeds C.

In the above arrangement, the following will discuss an operation of the image encoding apparatus of the present embodiment.

In the same manner as in embodiment 3, the bit allocation $T_I$, $T_P$ or $T_B$ calculated in the bit allocating circuit 10 is inputted, the bit allocating changing circuit 301 changes a value of the bit allocation so that the sum of a number of occupied bits in the buffer 6 and the bit allocation $T_I$, $T_P$ or $T_B$ does not exceed a predetermined constant value.

Thereafter, in the reference quantization step size determining circuit 11 and the quantization step size determining circuit 12, quantization widths are calculated per MB based upon the value of the bit allocation from the bit allocation changing circuit 301 and activity per MB, and the calculated results are outputted to the quantization step size changing circuit 401.

In the quantization step size changing circuit 401, a number of occupied bits in the buffer 6 BO is checked every time when the data of a quantization step size are inputted from the quantization step size determining circuit 12. Further, when the number of occupied bits in the buffer 6 BO exceeds the threshold C, the quantization widths are increased by multiplying $\alpha$ obtained by the calculation of the formula (17) by the quantization widths.

FIG. 10 shows a number of occupied bits in the buffer 6 in the case where an image 2 (an image which is shifted to a normal motion picture after the stop motion continues for 30 frames) is encoded by the image encoding apparatus of the present embodiment. In this example, k=3.1×10⁻⁴, C=8×10⁵, and ThI, ThP and ThB are all 8×10⁵. From FIG. 10, it is obvious that overflow of the buffer 6 is prevented more efficiently than in embodiment 3.

As mentioned above, the image encoding apparatus of the present embodiment having the arrangement of embodiment 3 is arranged so as to further include the quantization step size changing circuit 401 as the quantization step size changing means for monitoring a number of occupied bits in the buffer 6 BO so as to change the quantization widths calculated in the quantization step size determining circuit 12 to a greater value by multiplying $\alpha$ by the quantization widths when the number of occupied bits BO exceeds the predetermined threshold C.

Therefore, not only the bit allocation is changed as mentioned in embodiment 3, when the number of occupied bits in the buffer 6 BO exceeds the threshold C, but also the quantization step size is changed to a greater value, thereby making it possible to prevent the overflow in the buffer 6 more efficiently than in embodiment 3.

Here, in the present embodiment, the quantization step size is increased by multiplying $\alpha$ by the quantization step size, but the present embodiment is not limited to this. The quantization step size may be increased by adding a certain value or changing a function f (Q) (Q is a quantization step size) where the relationship: f(Q)>Q holds. Needless to say, the processes for increasing the quantization step size are performed in the case of BO>C.

In embodiments 1 through 4, an encoding method using arts, such as orthogonal transformation, motion compensation inter-frame prediction, is adopted, but the present invention can be applied to an encoding method using arts other than the above.

Figure 11:
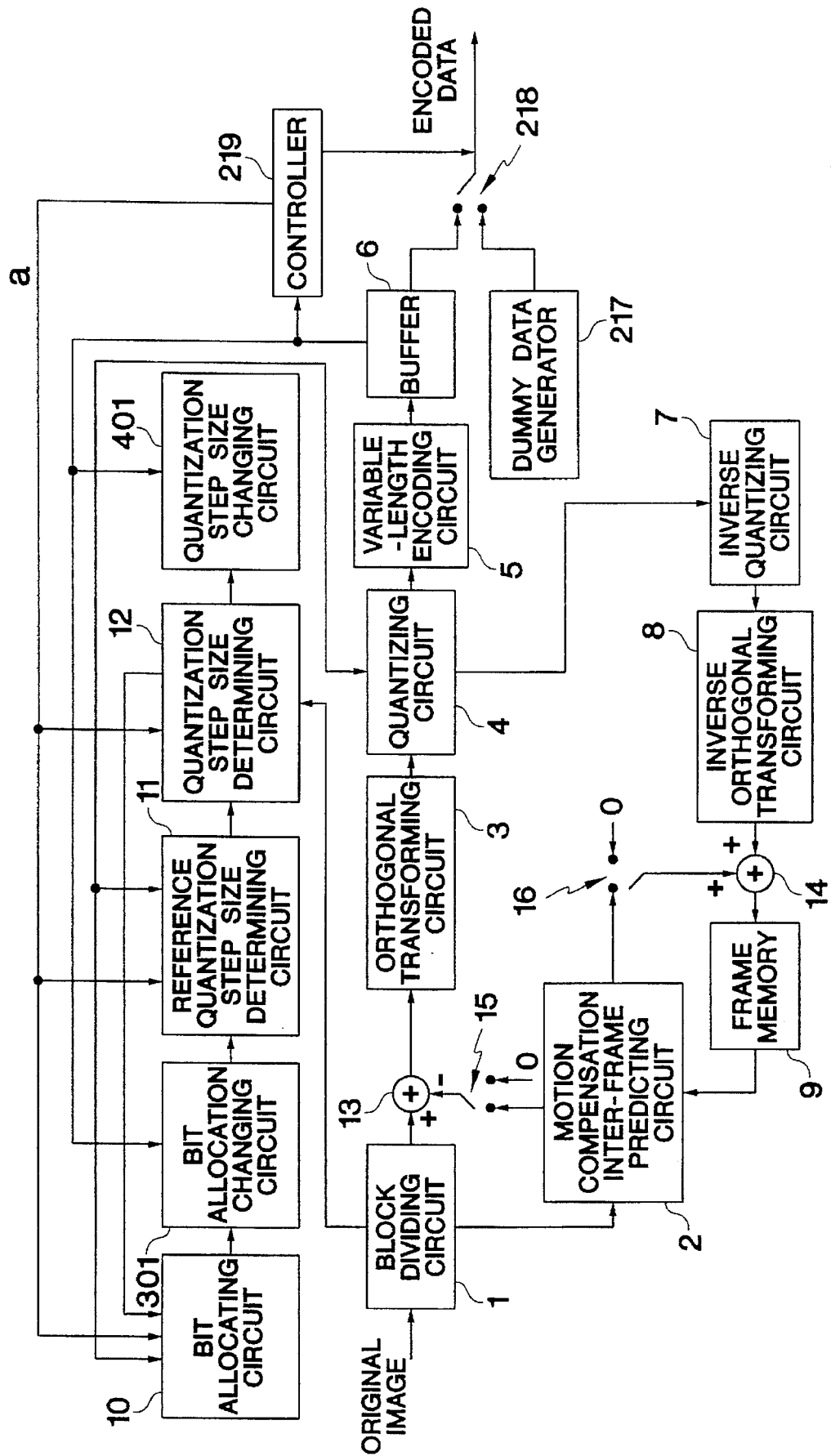
FIG. 11 is a block diagram which shows an arrangement of a main circuit in an image encoding apparatus including all methods in embodiments 1 through 4.

In addition, all or parts of the methods described in embodiments 1 through 4 are used simultaneously so that underflow or overflow of a buffer can be prevented. For example, FIG. 11 is a block diagram which shows an example of a encoding method including all the methods mentioned in embodiments 1 through 4. The image encoding apparatus in FIG. 11 that have the same arrangement and function, and that are mentioned in the above embodiments 1 through 4 are indicated by the same reference numerals and the description thereof is omitted.

Figure 12:
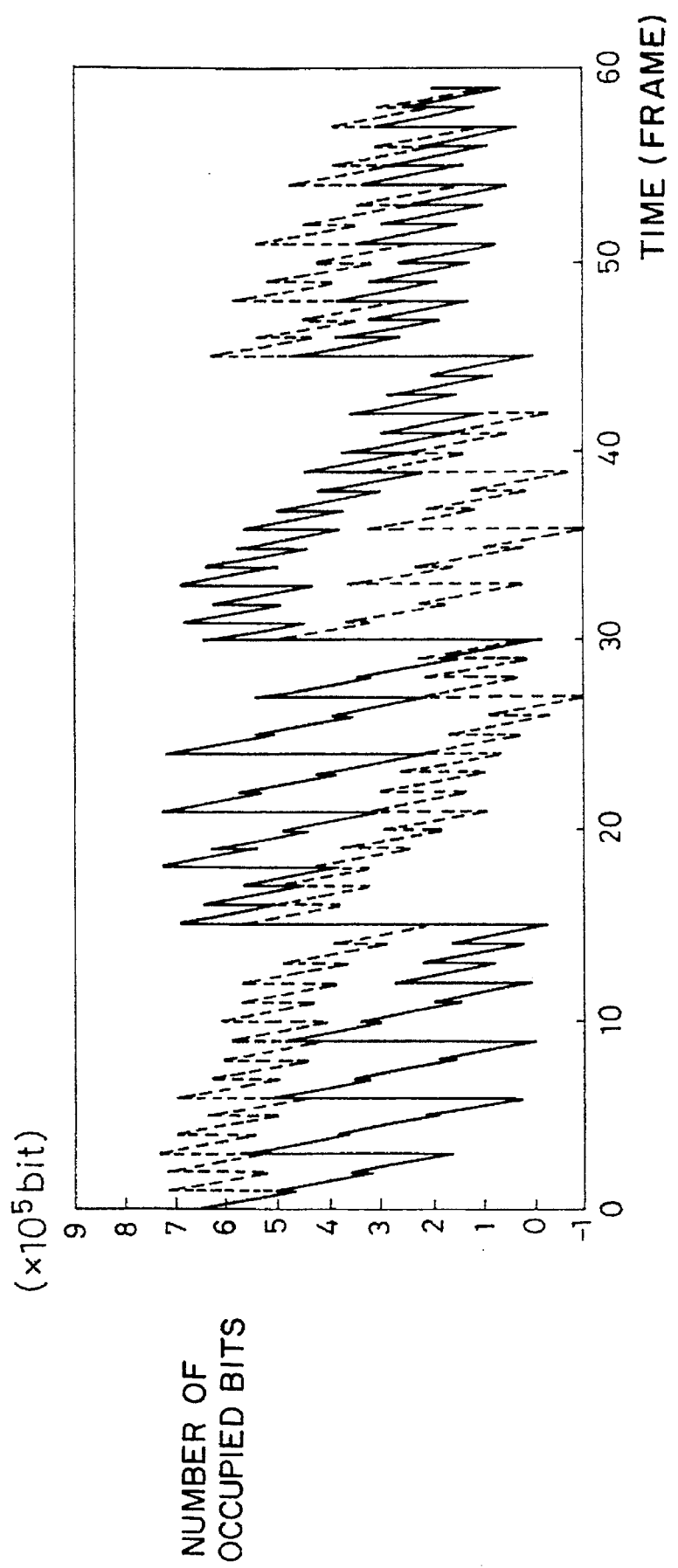
FIG. 12. is a graph which shows an aged change in a number of occupied bits in a buffer in the case where information corresponding to the image 2 and the image 3 is respectively encoded by the image encoding apparatus shown in FIG. 11.

A solid line and a broken line in FIG. 12 respectively show a number of occupied bits in the buffer 6 in the case where the image 2 and the image 3 are encoded by the image encoding apparatus in FIG. 11. Here, the threshold Th1 which makes the controller 219 change the switch 218 is −10⁵ bits, all the thresholds ThI, ThP and ThB of each picture which becomes a reference when the bit allocation per frame is changed are 8×10⁵, and the constant k in the formula (17) is 3.1×10⁻⁴ and C is 8×10⁵. From FIG. 12, it is obvious that the underflow and overflow of the buffer 6 is prevented efficiently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image encoding apparatus comprising:

quantizing means for quantizing an input image;

variable-length encoding means for performing variable-length encoding on the quantized result of said quantizing means;

temporary storage means for temporarily storing encoded data from said variable-length encoding means, the stored encoded data thereafter being transmitted at a fixed data rate;

encoded data amount control means for calculating a quantization step size of quantizing information to be encoded based upon the encoded result of said variable-length encoding means to control an amount of data encoded by said variable-length encoding means;

dummy data generating means for generating dummy data, eliminatable when decoding the encoded data;

switching means for switching an output of said image encoding apparatus between the encoded data from said temporary storage means and the dummy data from said dummy data generating means; and control means for monitoring a number of occupied bits of encoded data in said temporary storage means to control switching of said switching means such that the output of the image encoding apparatus is the encoded data from said temporary storage means when the number of occupied bits of encoded data exceeds a predetermined threshold, and such that transmission of encoded data from said temporary storage means is suspended and the output of the image encoding apparatus is the dummy data generated from said dummy data generating means when the number of occupied bits of encoded data is not more than the predetermined threshold, wherein said control means outputs a switching signal to said encoded data amount control means when the number of occupied bits of encoded data is not more than the predetermined threshold, and said encoded data amount control means initializes parameters which are used for calculation of the quantization step size when the switching signal is output.

2. The image encoding apparatus as defined in claim 1, further comprising:

block dividing means for dividing one frame of the input image into a plurality of macroblocks; and two-dimensional orthogonal transforming means for carrying out two-dimensional orthogonal transformation on an output of said block dividing means, wherein said quantizing means quantizes an output of said two-dimensional orthogonal transforming means.

3. The image encoding apparatus as defined in claim 2, further comprising:

motion compensation inter-frame predicting means for, while calculating a motion vector of each macroblock by comparing a current frame with another frame, predicting a macroblock in the current frame from the another frame, wherein intra-frame encoding is performed on a frame of a picture (I) appearing at predetermined frame intervals and inter-frame prediction encoding is performed on a frame of a picture other than the I picture.

4. The image encoding apparatus as defined in claim 3, further comprising:

subtracting means for obtaining a difference between image data predicted by said motion compensation inter-frame predicting means and current input image data, wherein when inter-frame prediction encoding is performed, two-dimensional orthogonal transformation is carried out on a prediction difference obtained by said subtracting means by said two-dimensional orthogonal transforming means and the transformed prediction difference is quantized by said quantizing means.

5. The image encoding apparatus as defined in claim 3, wherein said motion compensation inter-frame predicting means includes:

inverse quantizing means for inversely quantizing an output of said quantizing means;

inverse orthogonal transforming means for carrying out inverse orthogonal transformation on an output of said inverse quantizing means;

a frame memory for storing image data reconstructed by said inverse orthogonal transforming means; and motion compensation predicting circuit for calculating a motion vector from reconstructed image data stored in said frame memory and current input image data so as to predict a macroblock of a current frame.

6. The image encoding apparatus as defined in claim 1, wherein said encoded data amount control means includes:

bit allocating means for calculating a degree of complexity in an image of a frame to be encoded from the encoded results up to the previous frame, wherein a number of bits to be allocated to the frame to be encoded is determined from the calculated degree of complexity;

reference quantization step size determining means for calculating a virtual buffer fullness based upon the number of generated bits obtained from said variable-length encoding means and the number of bits allocated by said bit allocating means so as to determine the reference quantization step size from the virtual buffer fullness; and quantization step size determining means for calculating activities relating to fineness of a picture of an image, to determine a quantization step size used in the quantizing means by changing the reference quantization step size based upon calculated activities of an image to be encoded and an average value of the calculated activities of the frame previously encoded, wherein the parameters, initialized when the switching signal is input to said encoded data amount control means, include the degree of complexity, the initial virtual buffer fullness and the average value of the activities of the previous frame.

7. The image encoding apparatus as defined in claim 1, wherein said dummy data generating means generates dummy data with an arbitrary data length which include a dummy data start code indicating starting of the dummy data generation and a dummy data end code indicating an end of the generated dummy data.

8. The image encoding apparatus as defined in claim 1, wherein said dummy data generating means successively generates predetermined dummy codes composed of a plurality of bits.

9. The image encoding apparatus as defined in claim 1, wherein:

said variable-length encoding means adds a predetermined start code to a front of each frame, said dummy data generating means generates dummy data wherein same bits continue, and said control means controls a switching operation of the switching means immediately after the start code is outputted from said temporary storage means so that the dummy data are outputted from said dummy data generating means successively after generating the start code, when the output of the image encoding apparatus is switched to the dummy data.

10. The image encoding apparatus as defined in claim 1, wherein:

said temporary storage means stores a predetermined amount of eliminatable dummy data in an initial state, and the predetermined thresholds are set to value relatively smaller than the number of occupied bits in said temporary storage means, in an initial stage.

11. An image encoding apparatus, comprising:

quantizing means for quantizing information of an input image;

variable-length encoding means for performing variable-length encoding on the quantized result of said quantizing means;

temporary storage means for temporary storing encoded data from said variable-length encoding means, the stored encoded data thereafter being transmitted at a fixed data rate; and encoded data amount control means for calculating bit allocation per frame of image information to be encoded based upon the encoded result of said variable-length encoding means, and calculating a quantization step size from the calculated bit allocation, and adjusting the quantization step size of quantization in said quantizing means according to the calculated bit allocation to control an amount of the encoded data of said variable-length encoding means, wherein said encoded data amount control means includes bit allocation changing means for monitoring a number of occupied bits of encoded data in the temporary storage means and for changing the calculated bit allocation when a sum of a bit allocation of a frame, which has been calculated before encoding, and a number of occupied bits of encoded data in said temporary storage means, at the time of the calculation of the bit allocation, exceeds a predetermined threshold, the bit allocation being changed such that the sum does not exceed the predetermined threshold.

12. The image encoding apparatus as defined in claim 11, further comprising:

block dividing means for dividing one frame of the input image into a plurality of macroblocks; and two-dimensional orthogonal transforming means for carrying out two-dimensional orthogonal transformation on an output of said block dividing means, wherein said quantizing means quantizes an output of said two-dimensional orthogonal transforming means.

13. The image encoding apparatus as defined in claim 12, further comprising:

motion compensation inter-frame predicting means for, while calculating a motion vector of each macroblock by comparing a current frame with another frame, predicting a macroblock of the current frame from the another frame, wherein intra-frame encoding is performed on a frame of a picture (I) appearing at predetermined frame intervals and inter-frame prediction encoding is performed on a frame of a picture other than the I picture.

14. The image encoding apparatus as defined in claim 13, further comprising:

subtracting means for obtaining a difference between image data predicted by said motion compensation inter-frame predicting means and current input image data, wherein when inter-frame prediction encoding is performed, two-dimensional orthogonal transformation is carried out on a prediction difference obtained by said subtracting means by said two-dimensional orthogonal transforming means and the transformed prediction difference is quantized by said quantizing means.

15. The image encoding apparatus as defined in claim 13, wherein said motion compensation inter-frame predicting means includes:

inverse quantizing means for inversely quantizing an output of said quantizing means;

inverse orthogonal transforming means for carrying out inverse orthogonal transformation on an output of said inverse quantizing means;

a frame memory for storing image data reconstructed by said inverse orthogonal transforming means; and motion compensation predicting circuit for calculating a motion vector from the reconstructed image data stored in said frame memory and current input image data so as to predict a macroblock of a current frame.

16. The image encoding apparatus as defined in claim 11, wherein said encoded data amount control means includes:

bit allocating means for calculating a degree of complexity in an image of a frame to be encoded from the encoded results up to the previous frame, wherein a number of bits to be allocated to the frame to be encoded is determined from the calculated degree of complexity;

said bit allocation changing means changing the bit allocation obtained by said bit allocating means;

reference quantization step size determining means for calculating a virtual buffer fullness based upon the number of generated bits obtained from said variable-length encoding means and the bit allocation changed by said bit allocation changing means so as to determine a reference quantization step size from the virtual buffer fullness; and quantization step size determining means for calculating activities relating to fineness of a picture of an image, to determine a quantization step size used in the quantization step size determining circuit by changing the reference quantization step size based upon calculated activities of an image to be encoded and an average value of the calculated activities of the frame to be previously encoded.

17. The image encoding apparatus as defined in claim 11, wherein said bit allocation changing means changes the bit allocation to a value obtained by subtracting the number of occupied bits of encoded data from the predetermined threshold when the sum of the bit allocation to the frame, calculated before encoding, and the number of occupied bits of encoded data in the temporary storage means, at the time of calculation of the bit allocation, exceeds the predetermined threshold.

18. The image encoding apparatus as defined in claim 11, wherein said encoded data amount control means further includes quantization step size changing means for monitoring a number of occupied bits of encoded data in said temporary storage means and for changing the calculated quantization step size to a greater value when the number of occupied bits of encoded data exceeds the predetermined threshold.

* * * * *